US012372346B2

(12) United States Patent
Akahane et al.

(10) Patent No.: US 12,372,346 B2
(45) Date of Patent: Jul. 29, 2025

(54) RANGE-FINDING APPARATUS AND RANGE-FINDING METHOD

(71) Applicants: SONY GROUP CORPORATION, Tokyo (JP); SONY SEMICONDUCTOR SOLUTIONS CORPORATION, Kanagawa (JP)

(72) Inventors: Takahiro Akahane, Kanagawa (JP); Shun Kaizu, Tokyo (JP); Yusuke Ikeda, Kanagawa (JP); Yasutaka Kimura, Kanagawa (JP); Shinichirou Etou, Kanagawa (JP); Takeshi Oyakawa, Kanagawa (JP); Naoto Nagaki, Kanagawa (JP); Eiji Hirata, Tokyo (JP); Hiroshi Yuasa, Tokyo (JP)

(73) Assignees: SONY GROUP CORPORATION, Tokyo (JP); SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 408 days.

(21) Appl. No.: 17/795,491

(22) PCT Filed: Jan. 22, 2021

(86) PCT No.: PCT/JP2021/002292
§ 371 (c)(1),
(2) Date: Jul. 26, 2022

(87) PCT Pub. No.: WO2021/157393
PCT Pub. Date: Aug. 12, 2021

(65) Prior Publication Data
US 2023/0104085 A1 Apr. 6, 2023

(30) Foreign Application Priority Data
Feb. 3, 2020 (JP) ................ 2020-016471

(51) Int. Cl.
G01B 11/25 (2006.01)
G01S 7/481 (2006.01)
(Continued)

(52) U.S. Cl.
CPC ............ *G01B 11/25* (2013.01); *G01S 7/4814* (2013.01); *G01S 17/08* (2013.01); *H04N 25/131* (2023.01); *H04N 25/78* (2023.01)

(58) Field of Classification Search
CPC ....... G01B 11/25; G06T 7/521; G01S 7/4814; G01S 17/08; H04N 25/78
See application file for complete search history.

(56) References Cited

U.S. PATENT DOCUMENTS

2017/0241767 A1* 8/2017 Miyata ................ G06T 7/73

FOREIGN PATENT DOCUMENTS

JP 2017-146298 A 8/2017

OTHER PUBLICATIONS

International Search Report and Written Opinion of PCT Application No. PCT/JP2021/002292, issued on Mar. 16, 2021, 10 pages of ISRWO.

(Continued)

*Primary Examiner* — Thanh Luu
(74) *Attorney, Agent, or Firm* — CHIP LAW GROUP

(57) ABSTRACT

The range-finding apparatus includes a light source, an optical receiver, a setting unit, a detector, and a calculation unit. The light source projects light with a first irradiation pattern in a first period and projects light with a second irradiation pattern in a second period. The optical receiver receives light to output a pixel signal. The setting unit sets a reference signal based on the pixel signal in the first period. The detector detects whether or not the pixel signal varies from the reference signal by a first value or more in the second period and outputs a first detection signal indicative (Continued)

of a result obtained by the detection. The calculation unit calculates a distance to a to-be-measured object using the first detection signal.

10 Claims, 21 Drawing Sheets

(51) Int. Cl.
*G01S 17/08* (2006.01)
*H04N 25/131* (2023.01)
*H04N 25/78* (2023.01)

(56) References Cited

OTHER PUBLICATIONS

Posdamer, et al., "Surface Measurement by Space-Encoded Projected Beam Systems", Computer Graphics and Image Processing, vol. 18, No. 1, Jan. 1982, pp. 1-17.

* cited by examiner

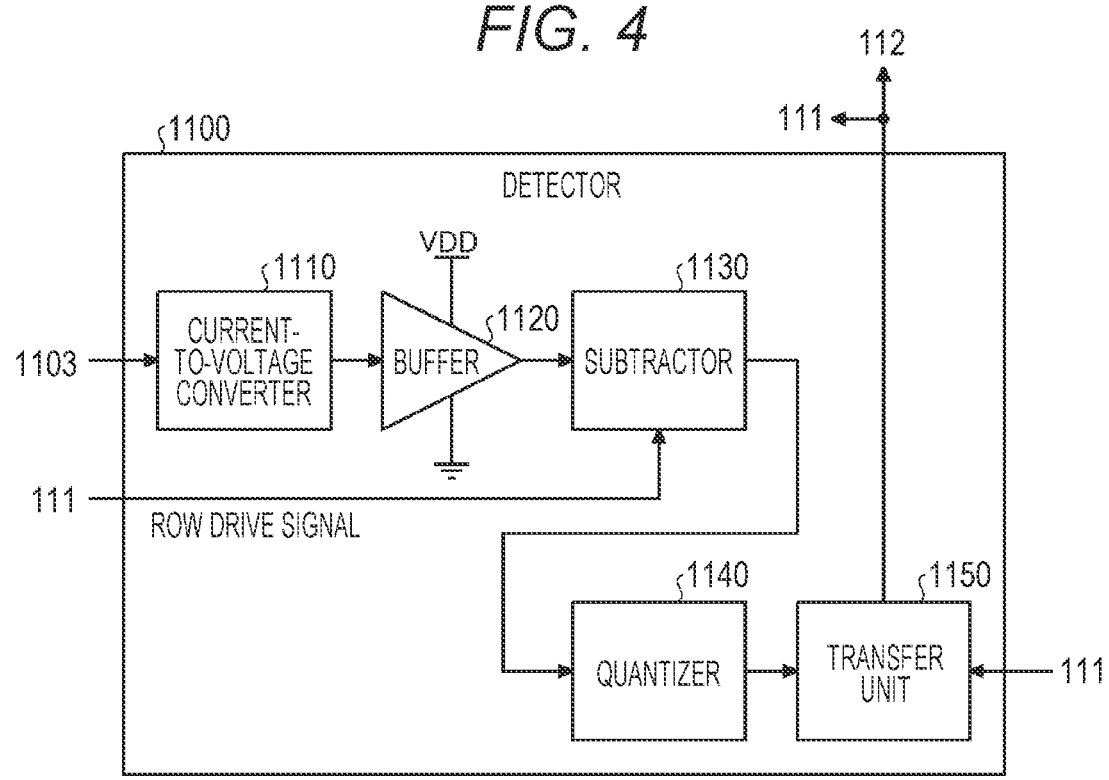
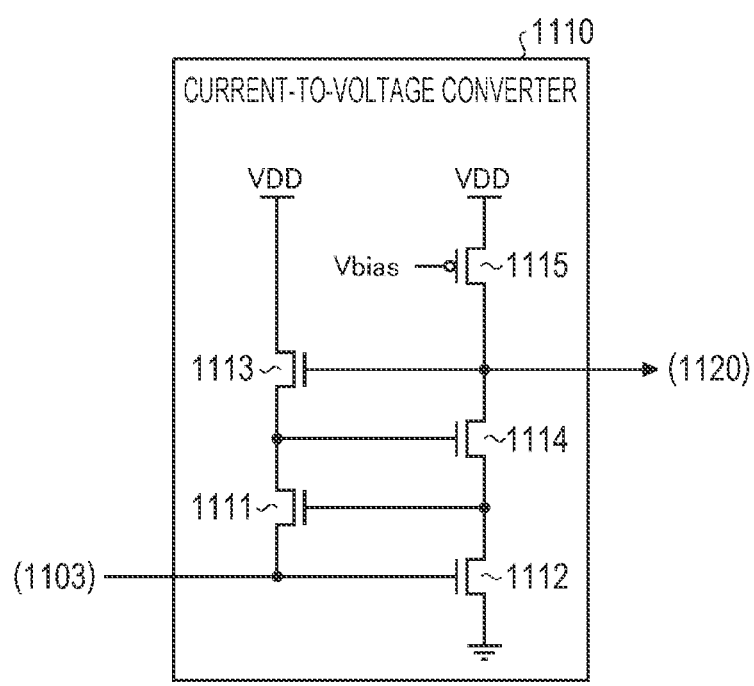

RANGE-FINDING APPARATUS AND RANGE-FINDING METHOD

CROSS REFERENCE TO RELATED APPLICATIONS

This application is a U.S. National Phase of International Patent Application No. PCT/JP2021/002292 filed on Jan. 22, 2021, which claims priority benefit of Japanese Patent Application No. JP 2020-016471 filed in the Japan Patent Office on Feb. 3, 2020. Each of the above-referenced applications is hereby incorporated herein by reference in its entirety.

TECHNICAL FIELD

The present disclosure relates to a range-finding apparatus and a range-finding method.

BACKGROUND ART

One technique for determining the three-dimensional shape of an object is known as a spatial coding technique. The spatial coding technique determines the three-dimensional shape, for example, using a plurality of captured images obtained by emitting and capturing a striped pattern with different periods.

CITATION LIST

Non-Patent Document

Non-Patent Document 1: J. L. Posdamer, M. D. Altschler, "Surface Measurement by Space-Encoded Projected Beam Systems", Computer Graphics and Image Processing vol. 18, Not, pp. 1-17, 1982.

SUMMARY OF THE INVENTION

Problems to be Solved by the Invention

The spatial coding technique is to acquire a plurality of captured images. Thus, image-capturing devices in the related art have had a problem with time-consuming to acquire a plurality of captured images and difficulty in metering, for example, the three-dimensional shape of a high-speed moving object (the distance to a to-be-measured object).

Thus, the present disclosure provides a range-finding apparatus and method capable of calculating the distance to a to-be-measured object at a higher speed.

Solutions to Problems

According to the present disclosure, there is provided a range-finding apparatus. The range-finding apparatus includes a light source, an optical receiver, a setting unit, a detector, and a calculation unit. The light source projects light with a first irradiation pattern in a first period and projects light with a second irradiation pattern in a second period. The optical receiver receives light to output a pixel signal. The setting unit sets a reference signal on the basis of the pixel signal in the first period. The detector detects whether or not the pixel signal varies from the reference signal by a first value or more in the second period and outputs a first detection signal indicative of a result obtained by the detection. The calculation unit calculates a distance to a to-be-measured object using the first detection signal.

BRIEF DESCRIPTION OF DRAWINGS

FIG. 4 is a block diagram illustrating an exemplary schematic configuration of a detector according to the first embodiment of the present disclosure.

FIG. 5 is a circuit diagram illustrating another example of a current-to-voltage converter according to the first embodiment of the present disclosure.

MODE FOR CARRYING OUT THE INVENTION

Figure 1:
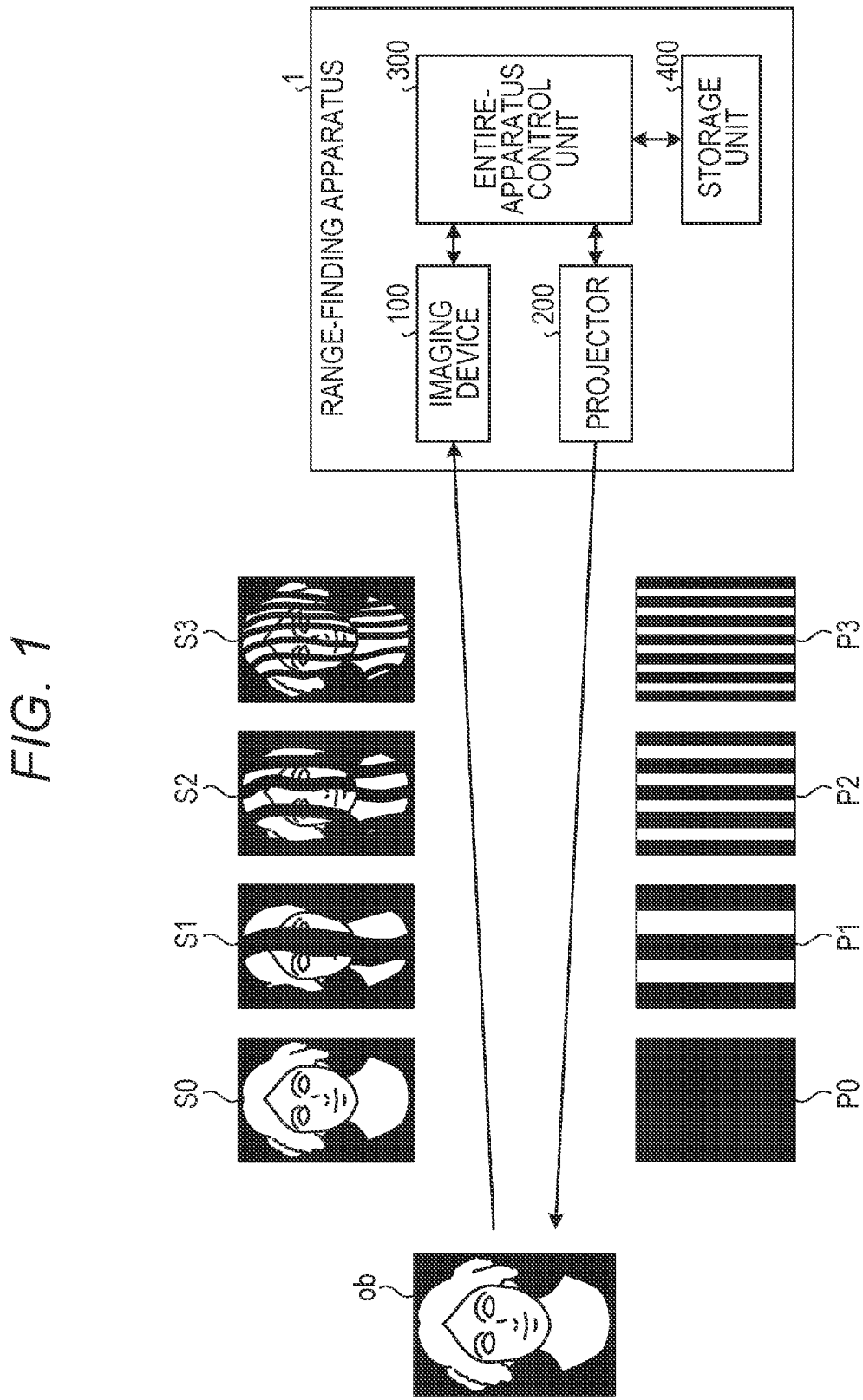
FIG. 1 is a diagram illustrating an exemplary schematic configuration of a range-finding apparatus according to a first embodiment of the present disclosure.

Hereinafter, a preferred embodiment of the present disclosure will be described in detail with reference to the appended drawings. Note that, in this specification and the appended drawings, components that have substantially the same function and configuration are denoted with the same reference numerals, and repeated explanation of these structural elements is omitted.

The description is given in the following order.
1. First Embodiment
  1.1. Exemplary Schematic Configuration of Range-Finding Apparatus
  1.2. Image-Capturing Device
  1.2.1. Exemplary Configuration of Image-Capturing Device
  1.2.2. Exemplary Configuration of Unit Pixel
  1.2.3. Exemplary Configuration of Detector
    1.2.3.1. Exemplary Configuration of Current-to-Voltage Converter
    1.2.3.2. Exemplary Configuration of Subtractor and Quantizer
  1.2.4. Exemplary Operation of Image-Capturing Device
  1.3. Control Unit of Range-Finding Apparatus
  1.4. Exemplary Operation of Range-Finding Apparatus
2. Second Embodiment
  2.1. Exemplary Functional Configuration of Image-Capturing Device
  2.2. Exemplary Configuration of Unit Pixel
  2.3. Exemplary Operation of Image-Capturing Device
3. Other Embodiments
4. Supplement 1. First Embodiment <1.1. Exemplary Configuration of Range-Finding Apparatus>

FIG. 1 is a diagram illustrating an exemplary schematic configuration of a range-finding apparatus 1 according to a first embodiment of the present disclosure. The range-finding apparatus 1 includes, for example, an image-capturing device 100, a projector 200, an entire-apparatus control unit 300, and a storage unit 400, as illustrated in FIG. 1. The range-finding apparatus 1 measures the distance to a to-be-measured object ob using a spatial coding technique to meter the three-dimensional shape of the to-be-measured object ob.

The projector 200 projects a predetermined image in accordance with instructions of the entire-apparatus control unit 300. The predetermined image is, for example, a light-dark pattern with different periods. The projector 200 irradiates the to-be-measured object ob with the irradiation light of the light-dark pattern. The projector 200 sequentially irradiates it with the irradiation light of irradiation patterns P0 to Pn to be used as a predetermined projection image, where n=3 in FIG. 1.

Moreover, the irradiation pattern P0 is an irradiation pattern for determining a threshold value of the image-capturing device 100 and is, for example, a black image (irradiation pattern is all "dark"), that is, an irradiation pattern that does not apply the irradiation light. The irradiation patterns P1 to Pn are irradiation patterns with different widths of the vertical stripes in the example of FIG. 1.

The image-capturing device 100 captures an image of a to-be-measured object ob when the projector 200 irradiates it with the irradiation light of the individual irradiation patterns P0 to Pn in accordance with the instruction of the entire-apparatus control unit 300. The image-capturing device 100 is, for example, a dynamic vision sensor (DVS) and outputs a captured image of a pixel value corresponding to whether or not the intensity of light received by a pixel exceeds a threshold value. In the example of FIG. 1, the image-capturing device 100 sets (or resets) a threshold value depending on the irradiation timing of the irradiation pattern P0 and captures the captured images S1 to Sn corresponding to the respective irradiation patterns P1 to Pn. In other words, the image-capturing device 100 outputs the captured images S1 to Sn in the case of applying the light of the irradiation patterns P1 to P3, rather than the case of applying the light of the irradiation pattern P0. These captured images S1 to Sn (hereinafter also referred to as differential images S1 to Sn) indicate whether or not the intensity of light received by each pixel exceeds the threshold value (whether it is brightened or not). Moreover, the to-be-measured object ob is illustrated in the differential images S1 to Sn to make the description easy to understand in FIG. 1. However, the actual differential images S1 to Sn are images indicating whether or not they are brighter than the image produced upon applying the light of the irradiation pattern P0 (see the captured image S0 in FIG. 1), so, in some cases, they are different from the differential images S1 to Sn illustrated in FIG. 1. This is similarly applied to the following figures.

In this regard, for example, a traditional image sensor using the image-capturing device 100, which outputs a luminance value corresponding to the intensity of received light, necessitates for outputting a plurality of captured images that each has a plurality of bits. In addition, for such a traditional image sensor, the signal processing by the entire-apparatus control unit 300 in the subsequent stage necessitates the calculation of a difference between luminance values of respective pixels of the captured image and the determination of whether the pixel value of each pixel is brightened or not. Thus, the calculation of the distance to the to-be-measured object ob using the spatial coding technique with a traditional image sensor will take time to calculate the distance.

On the other hand, the image-capturing device 100 according to the present embodiment outputs, when the light of the irradiation pattern P1 to Pn is applied, the differential images S1 to Sn indicating whether or not the intensity of light received by each pixel increases as compared with the case of applying the light of the background irradiation pattern P0. This configuration allows the image-capturing device 100 to output the captured images S1 to Sn to the entire-apparatus control unit 300 at a higher speed than that of a traditional image sensor. In addition, in the signal processing by the entire-apparatus control unit 300 in the following stage, it is possible to omit the determination of whether or not the pixel value of each pixel is brightened. Thus, the use of the range-finding apparatus 1 of the present embodiment makes it possible to shorten the time for the distance calculation to the to-be-measured object ob. Moreover, the image-capturing device 100 is described later in detail.

The entire-apparatus control unit 300 controls individual components of the range-finding apparatus 1. The entire-apparatus control unit 300 controls, for example, the projector 200 so that the projector 200 applies the predetermined irradiation light of the irradiation pattern P0 to Pn. In addition, the entire-apparatus control unit 300 controls the image-capturing device 100 so that the image-capturing device 100 resets the threshold value of the image-capturing device 100 while the projector 200 applies the irradiation light of the background irradiation pattern P0. The entire-apparatus control unit 300 controls the image-capturing device 100 so that the image-capturing device 100 captures an image of the to-be-measured object ob while the projector 200 applies the irradiation light of the predetermined irradiation patterns P1 to Pn.

The entire-apparatus control unit 300 operates as a calculation unit that calculates a depth (distance to the to-be-measured object ob) in each pixel of the captured images S1 to Sn on the basis of the plurality of differential images S1 to Sn captured by the image-capturing device 100. The way to calculate the depth by the entire-apparatus control unit 300 is described later.

The storage unit 400 stores information that can be used for range-finding of the to-be-measured object ob by the range-finding apparatus 1, such as the irradiation patterns P0 to Pn.

Moreover, the number of irradiation patterns projected by the projector 200 is herein set to, but not limited to, four. A plurality, for example, three, or five or more of the irradiation patterns, can be used. In addition, the irradiation pattern of vertical stripes with different periods is herein used, but the irradiation pattern is not limited to this type of pattern. In one example, the irradiation pattern can be a pattern of horizontal stripes. In addition, the pattern can be a combination of vertical stripes and horizontal stripes. The irradiation pattern can be any pattern that can be binary coded.

<1.2. Image-Capturing Device>
<1.2.1. Exemplary Configuration of Image-capturing Device>

Figure 2:
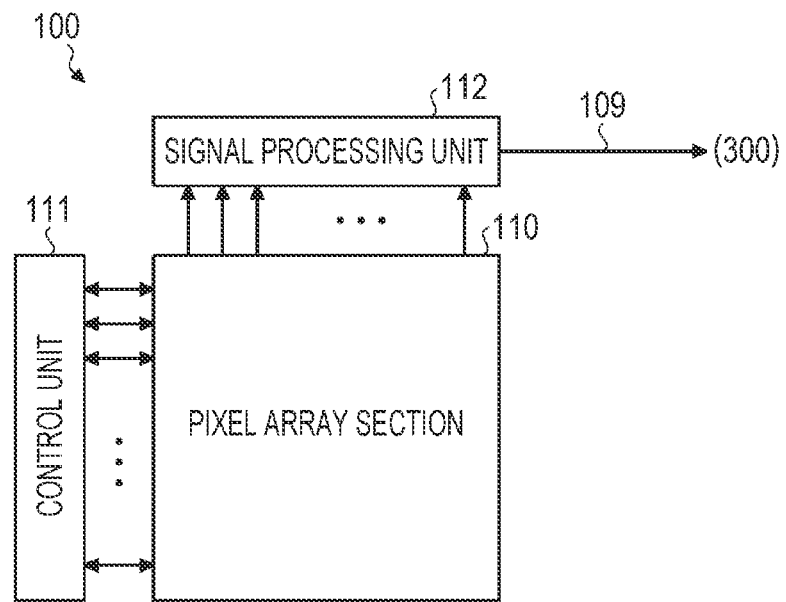
FIG. 2 is a diagram illustrating an exemplary functional configuration of an image-capturing device according to the first embodiment of the present disclosure.

The image-capturing device 100 according to the first embodiment of the present disclosure is now described in detail. FIG. 2 is a diagram illustrating an exemplary functional configuration of an image-capturing device 100 according to the first embodiment of the present disclosure.

The image-capturing device 100 includes a pixel array section 110, a control unit 111, and a signal processing unit 112, as illustrated in FIG. 2.

The pixel array section 110 has a plurality of unit pixels arranged in a two-dimensional grid pattern. The unit pixel is described in detail later, but for example, it includes a photoelectric transducer such as a photodiode and a pixel circuit (corresponding to a detector 1100 described later in the present embodiment). The pixel circuit detects whether or not an electric current value (or a voltage value converted from the electric current value) of a photoelectric current caused by the electric charge generated by the photoelectric transducer exceeds a predetermined threshold value. The pixel circuit can be herein shared by a plurality of photoelectric transducers. In such a case, each unit pixel includes one photoelectric transducer and the pixel circuit being shared.

The plurality of unit pixels in the pixel array section 110 can be grouped into a plurality of pixel blocks in which each includes a predetermined number of unit pixels. Herein, a set of unit pixels or pixel blocks arranged in the horizontal direction is referred to as a "row", and a set of unit pixels or pixel blocks arranged in a direction perpendicular to the row is referred to as a "column".

A traditional DVS is an asynchronous image-capturing device that, upon detecting the occurrence of an address event in the pixel circuit, reads out a signal from a unit pixel corresponding to the detected pixel circuit. On the other hand, the image-capturing device 100 of the present embodiment is a synchronous DVS that reads out a signal from a unit pixel at a predetermined timing in accordance with the control from the control unit 111. The timing of reading out the signal from the unit pixel is described in detail later.

The control unit 111 controls the pixel array section 110 so that the pixel array section 110 resets the threshold value of the unit pixel or reads out the signal from the unit pixel.

The signal processing unit 112 executes predetermined signal processing on a signal input from the unit pixel and supplies a result obtained by the signal processing as detection data (a detection signal) to the entire-apparatus control unit 300 via a signal line 109.

<1.2.2. Exemplary Configuration of Unit Pixel>

Figure 3:
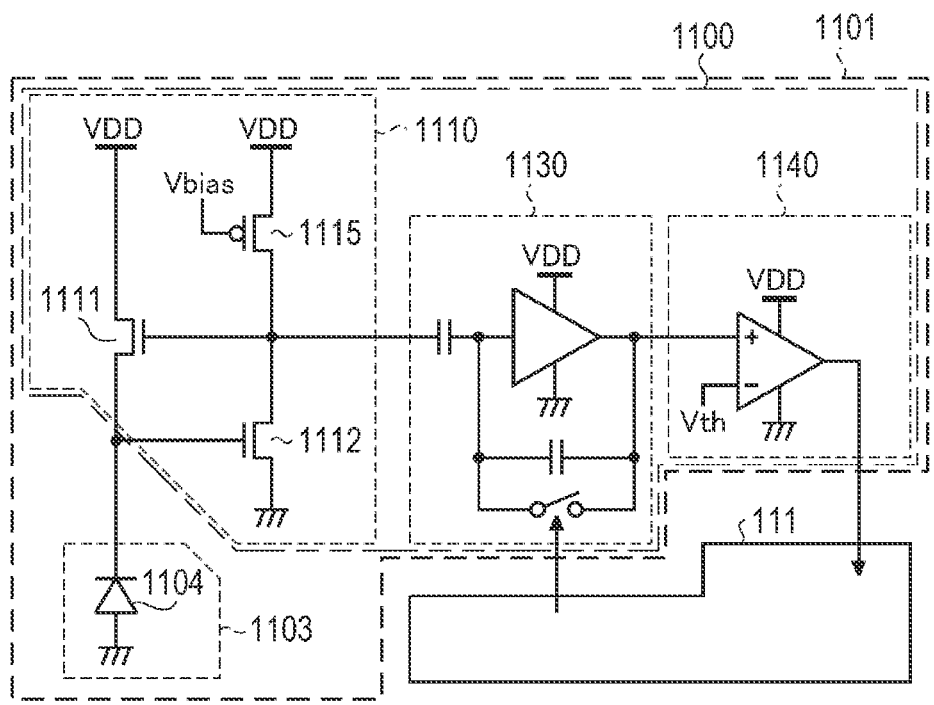
FIG. 3 is a circuit diagram illustrating an exemplary schematic configuration of a unit pixel according to the first embodiment of the present disclosure.

FIG. 3 is a circuit diagram illustrating an exemplary schematic configuration of a unit pixel 1101 according to the first embodiment of the present disclosure. The unit pixel 1101 includes, for example, an optical receiver 1103 and a detector 1100, as illustrated in FIG. 3. Moreover, the control unit 111 is also referred to as a logic circuit 111.

The optical receiver 1103 includes, for example, a photoelectric transducer 1104 such as a photodiode, and its output is connected to the detector 1100.

The detector 1100 includes, for example, a current-to-voltage converter 1110 and a subtractor 1130. In addition to these components, the detector 1100 also includes a buffer, a quantizer, or a transfer unit. The detector 1100 is described in detail later with reference to FIG. 4 or the like.

Such a configuration allows the photoelectric transducer 1104 of the optical receiver 1103 to convert the incident light photoelectrically to generate an electric charge. The electric charge generated by the photoelectric transducer 1104 is input to the detector 1100 in the form of a photocurrent having an electric current value corresponding to the quantity of electric charge.

<1.2.3. Exemplary Configuration of Detector>

FIG. 4 is a block diagram illustrating an exemplary schematic configuration of a detector 1100 according to the first embodiment of the present disclosure. As illustrated in FIG. 4, the detector 1100 includes a buffer 1120 and a transfer unit 1150 in addition to the current-to-voltage converter 1110, the subtractor 1130, and a quantizer 1140 illustrated in FIG. 3.

The current-to-voltage converter 1110 converts a photoelectric current (pixel signal) from the optical receiver 1103 into its logarithmic voltage signal and outputs the resultant voltage signal to the buffer 1120.

The buffer 1120 corrects the voltage signal from the current-to-voltage converter 1110 and outputs the corrected voltage signal to the subtractor 1130.

The subtractor 1130 lowers the voltage level of the voltage signal from the buffer 1120 in accordance with a row drive signal from the control unit 111 and outputs the lowered voltage signal to the quantizer 1140.

The quantizer 1140 quantizes the voltage signal from the subtractor 1130 into a digital signal and outputs the resultant digital signal to the transfer unit 1150 as a detection signal.

The transfer unit 1150 transfers the detection signal from the quantizer 1140 to the control unit 111 and the signal processing unit 112.

<1.2.3.1. Exemplary Configuration of Current-to-Voltage Converter>

FIG. 5 is a circuit diagram illustrating another example of a current-to-voltage converter 1110 according to the first embodiment of the present disclosure. The current-to-voltage converter 1110 of the configuration illustrated in FIG. 4 described above can be, for example, a so-called source-follower current-to-voltage converter that includes an LG transistor 1111, an amplification transistor 1112, and a constant current circuit 1115 as illustrated in FIG. 3. However, such a configuration is not limited to this example and can be a so-called gain boost current-to-voltage converter that includes, for example, two LG transistors 1111 and 1113, two amplification transistors 1112 and 1114, and a constant current circuit 1115, as illustrated in FIG. 5.

As illustrated in FIG. 3, the source of the LG transistor 1111 and the gate of the amplification transistor 1112 are connected to, for example, the cathode of the photoelectric transducer 1104 of the optical receiver 1103. The drain of the LG transistor 1111 is connected to, for example, a power supply terminal VDD.

Further, for example, the source of the amplification transistor 1112 is grounded, and the drain of the amplification transistor 1112 is connected to the power supply terminal VDD via the constant current circuit 1115. The constant current circuit 1115 can be a load MOS transistor such as a P-type metal-oxide-semiconductor (MOS) transistor.

On the other hand, in the case of gain boost type, as illustrated in FIG. 5, the source of the LG transistor 1111 and the gate of the amplification transistor 1112 are connected to, for example, the cathode of the photoelectric transducer 1104 of the optical receiver 1103. In addition, the drain of the LG transistor 1111 is connected to, for example, the source of the LG transistor 1113 and the gate of the amplification transistor 1112. The drain of the LG transistor 1113 is connected to, for example, the power supply terminal VDD.

Further, for example, the source of the amplification transistor 1114 is connected to the gate of the LG transistor 1111 and the drain of the amplification transistor 1112. The drain of the amplification transistor 1114 is connected to the power supply terminal VDD, for example, via the constant current circuit 1115.

Such a connection illustrated in FIG. 3 or 5 configures a loop-shaped source follower circuit. This configuration allows the photocurrent from the optical receiver 1103 to be converted into a voltage signal with a logarithmic value corresponding to the quantity of electric charge. Moreover, the LG transistors 1111 and 1113 and the amplification transistors 1112 and 1114 can be configured as, for example, an NMOS transistor.

<1.2.3.2. Exemplary Configuration of Subtractor and Quantizer>

Figure 6:
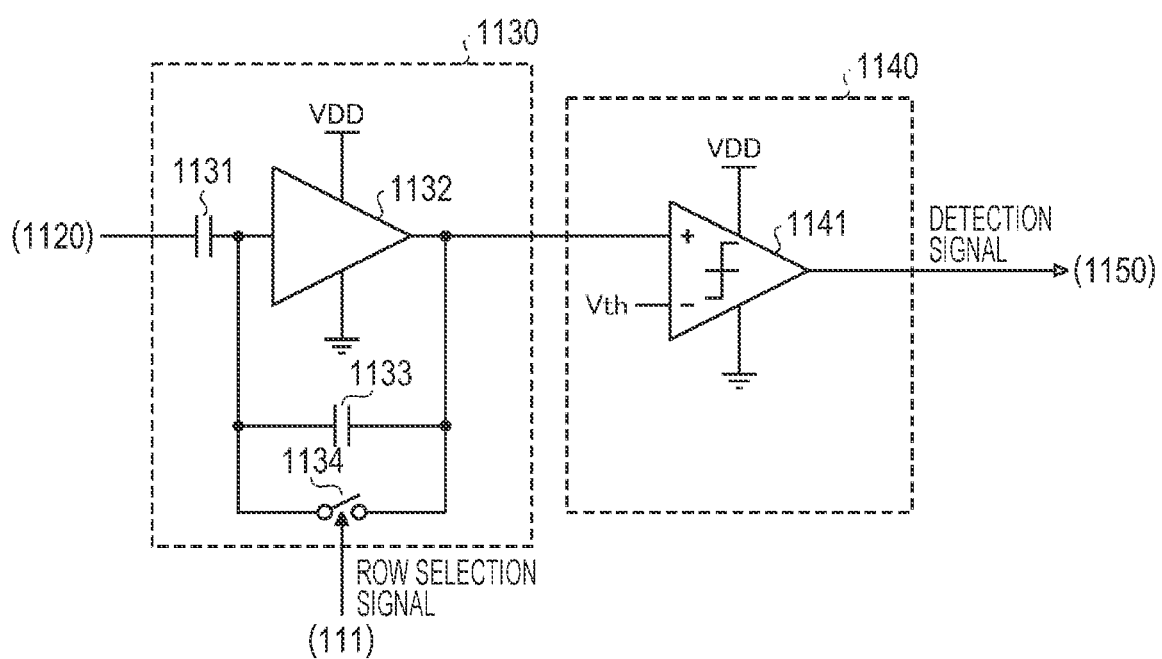
FIG. 6 is a circuit diagram illustrating an exemplary schematic configuration of a subtractor and a quantizer according to the first embodiment of the present disclosure.

FIG. 6 is a circuit diagram illustrating an exemplary schematic configuration of a subtractor 1130 and a quantizer 1140 according to the first embodiment of the present disclosure. The subtractor 1130 includes capacitors 1131 and 1133, an inverter 1132, and a switch 1134, as illustrated in FIG. 6. In addition, the quantizer 1140 includes a comparator 1141.

The capacitor 1131 has one end connected to the output terminal of the buffer 1120 and the other end connected to the input terminal of the inverter 1132. The capacitor 1133 is connected in parallel to the inverter 1132. The switch 1134 opens and closes the path connecting both ends of the capacitor 1133 in accordance with the row drive signal.

The inverter 1132 inverts the voltage signal input via the capacitor 1131. The inverter 1132 outputs the inverted signal to a non-inverting input terminal with a plus (+) sign of the comparator 1141.

In the case where the switch 1134 is turned on, a voltage signal Vinit is input to the terminal of the capacitor 1131 that is on the side of the buffer 1120.

Further, the opposite side of the capacitor 1131 is a virtual ground terminal. The potential of the virtual ground terminal is set to zero for the convenience of description. In this event, a potential Qinit accumulated in the capacitor 1131 is expressed by Formula (1) below, where the capacity of the capacitor 1131 is C1. On the other hand, both ends of the capacitor 1133 are short-circuited, so the accumulated charge becomes zero.

$$Q\text{init} = C1 \times V\text{init} \tag{1}$$

Then, considering the case where the switch 1134 is turned off and the voltage on the terminal of the capacitor 1131 that is on the side of the buffer 1120 changes to a Vafter, an electric charge Qafter accumulated in the capacitor 1131 is expressed by Formula (2) below:

$$Q\text{after} = C1 \times V\text{after} \tag{2}$$

On the other hand, an electric charge Q02 accumulated in the capacitor 1133 is expressed by Formula (3) below, where the output voltage is Vout:

$$Q02 = -C2 \times V\text{out} \tag{3}$$

In this event, the total quantity of electric charge of the capacitors 1131 and 1133 do not change, so Formula (4) is yielded as follows:

$$Q\text{init} = Q\text{after} + Q02 \tag{4}$$

Substituting Formulas (1) to (3) for Formula (4) and rearranging terms yield Formula (5) below:

$$V\text{out} = -(C1/C2) \times (V\text{after} - V\text{init}) \tag{5}$$

Formula (5) represents the subtraction operation for the voltage signal, and the gain of the result obtained by the subtraction is C1/C2. Maximizing the gain is typically desirable, so it is preferable to design C1 to be larger and C2 to be smaller. On the other hand, C2, which is too small, increases kTC noise, resulting in deterioration of noise characteristics. Thus, reduction in the capacity of C2 is restricted to the acceptable range of noise. In addition, the detector 1100 provided with the subtractor 1130 is mounted on the respective unit pixels 1101, so the capacities C1 and C2 have a limited mounting area. Considering this, the values of the capacities C1 and C2 are determined.

The comparator 1141 compares the voltage signal from the subtractor 1130 with a predetermined threshold voltage Vth applied to its inverting input terminal with a minus (−) sign. The comparator 1141 outputs a signal indicative of a result, which is obtained by the comparison, to the transfer unit 1150 as the detection signal.

Further, a gain A of the entire detector 1100 described above is expressed by Formula (6) below, where the conversion gain of the current-to-voltage converter 1110 is $CG_{log}$ and the gain of the buffer 1120 is set to '1'.

[Math. 1]

$$A = \frac{CG_{log} \cdot C1}{C2} \sum_{n=1}^{N} i_{photo\_n} \quad (6)$$

In Formula (6), $i_{photo\_n}$ is the photocurrent of the n-th pixel of the unit pixels 1101, and the unit thereof is, for example, ampere (A). N is the number of the unit pixels 1101 in the pixel block and is set to '1' in the present embodiment.

<1.2.4. Exemplary Operation of Image-Capturing Device>

Figure 7:
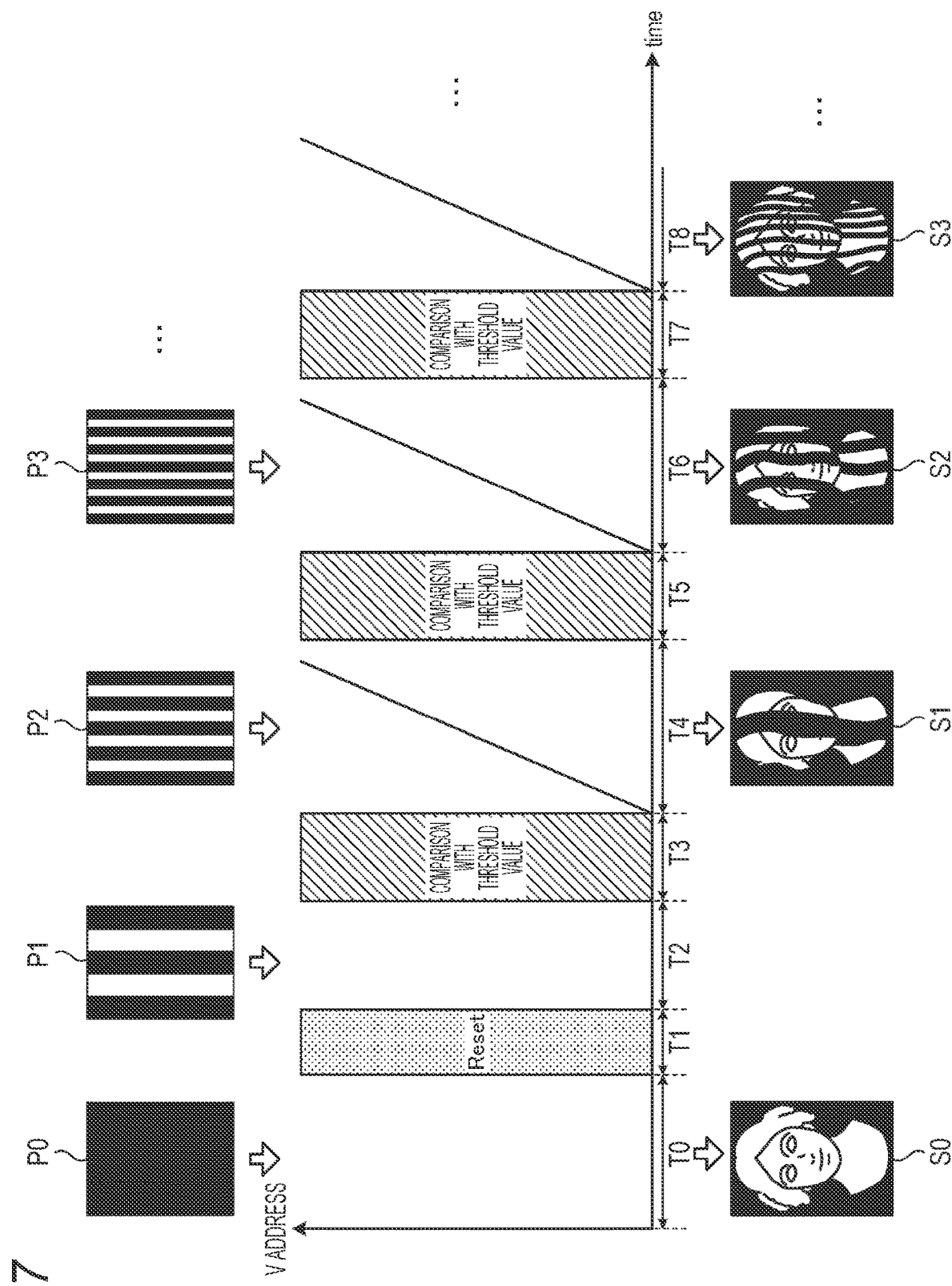
FIG. 7 is a diagram illustrated to describe an operation example of an image-capturing device according to the first embodiment of the present disclosure.

The description is now given of an example of the readout operation of the detection signal (pixel value) in the image-capturing device 100. FIG. 7 is a diagram illustrated to describe an operation example of an image-capturing device 100 according to the first embodiment of the present disclosure. In FIG. 7, the horizontal axis represents time, and the vertical axis represents the address in the vertical direction (V address) of the unit pixel 1101 being scanned.

If the projector 200 applies light of the background irradiation pattern P0 in a period T0, the image-capturing device 100 performs the exposure in synchronization with the light emission of the projector 200 and generates an electric charge Q0 corresponding to the incident light.

Figure 8:
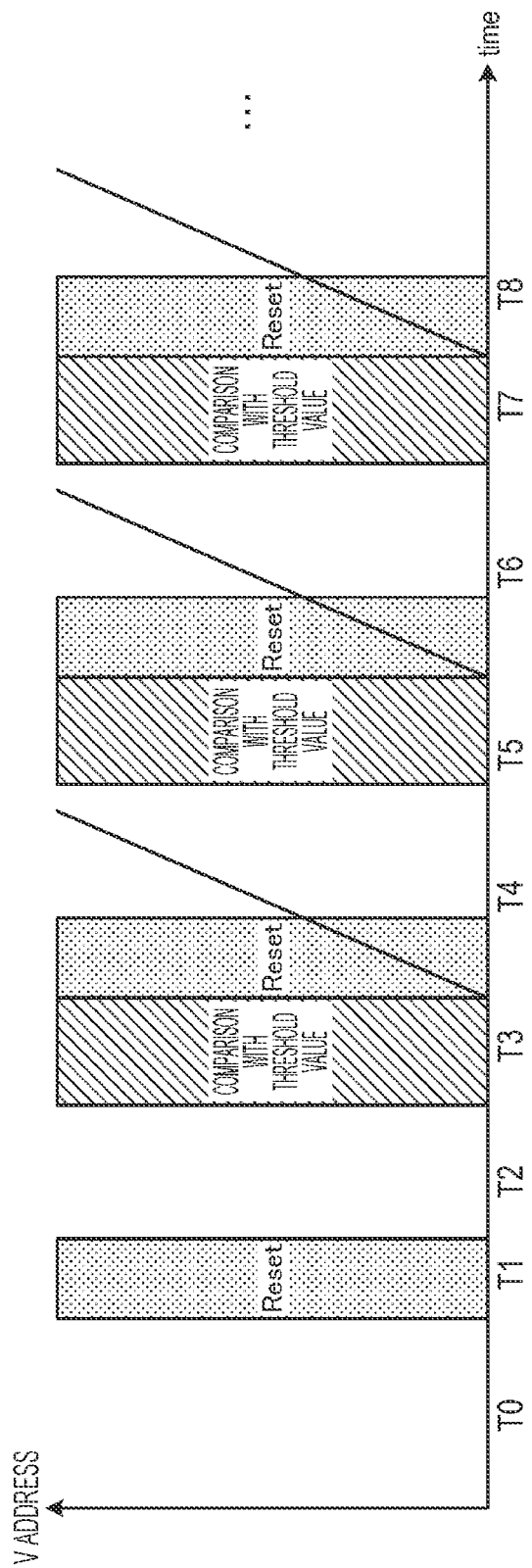
FIG. 8 is a diagram illustrating an example of an image-capturing operation by the image-capturing device.

The image-capturing device 100 then sets (or resets) a threshold value Th of the detector 1100 in a period T1 depending on the electric charge Q0 generated in the period T0. Specifically, the image-capturing device 100 inputs a voltage signal V0 in the capacitor 1131 that is on the side of the buffer 1120 by turning on the switch 1134 illustrated in FIG. 6. The voltage signal V0 is generated by performing the logarithmic conversion on the quantity of electric charge (photocurrent) generated during exposure of the background irradiation pattern P0. This configuration sets a value to be subtracted (the voltage signal Vinit) from the voltage signal Vafter in Formula (5) above. Moreover, FIG. 8 illustrates the captured image S0 having the electric charge Q0 generated in the period T1 as the pixel value.

If the projector 200 applies light of the irradiation pattern P1 in a period T2, the image-capturing device 100 performs the exposure in synchronization with the light emission of the projector 200 and generates an electric charge Q1 corresponding to the incident light.

In a period T3, the image-capturing device 100 subtracts the voltage signal V0 from a voltage signal V1 corresponding to the electric charge Q1 generated in the period T2. The image-capturing device 100 compares a result obtained by the subtraction with the threshold voltage Vth to determine whether or not the electric charge Q1 generated in the period T2 is larger than an electric charge Q1 generated in the period T1. The image-capturing device 100 determines whether or not the pixel value of the unit pixel 1101 in the case of being irradiated with the light of the irradiation pattern P1 is larger (brighter) than that in the case of being irradiated with the light of the background irradiation pattern P0. In other words, the image-capturing device 100 sets the pixel value (the voltage signal V0) in the case of being irradiated with the light of the background irradiation pattern P0 to be the threshold value Th to determine whether or not the pixel value (the voltage signal V1) in the case of being irradiated with the light of the irradiation pattern P1 is larger than the threshold value Th.

In a period T4, the image-capturing device 100 sequentially reads out the pixel values indicating the comparison result for each pixel to acquire the differential image S1. In this manner, the image-capturing device 100 according to the first embodiment of the present disclosure performs a synchronous operation, which is a so-called global hold operation that reads out pixel values at a predetermined timing, rather than an asynchronous operation that reads out pixel values at the occurrence of an event.

Furthermore, in the period T4, the projector 200 applies light of the irradiation pattern P2, and the image-capturing device 100 performs the exposure in synchronization with the light emission of the projector 200 and generates an electric charge Q2 corresponding to the incident light.

In this regard, the traditional DVS resets the threshold value Th if the threshold value Th and the voltage signal V1 are compared. FIG. 8 is a diagram illustrating an example of an image-capturing operation by an image-capturing device in the related art. As described above, in the case where the image-capturing device performs the global hold operation, if the threshold value Th and the voltage signal V1 are compared in the period T3 as illustrated in FIG. 8, the switch 1134 (see FIG. 6) is turned on, resetting the threshold value Th and setting the threshold value Th to the voltage signal V1. In this way, the resetting of the threshold value Th causes the determination of whether or not the pixel value of the captured image S1 immediately previous has changed for each pixel value in the subsequent comparison with the threshold value.

Meanwhile, the image-capturing device 100 according to the present embodiment does not reset the threshold value Th after the comparison with the threshold value in the period T3, as illustrated in FIG. 7. In other words, the voltage signal V2 corresponding to the electric charge Q2 is compared with the threshold value in the subsequent period T5 without turning on the switch 1134 (see FIG. 6).

This configuration allows the image-capturing device 100 to determine whether or not the voltage signal V2 corresponding to the electric charge Q2 generated in the period T4 is larger than the threshold value Th (the voltage signal V0).

In a period T6, the image-capturing device 100 sequentially reads out the pixel values indicating the determination result for each pixel, acquiring the differential image S2 indicative of a difference from the image-capturing result upon being irradiated with the light of the background irradiation pattern P0. Continuing in a similar way, the image-capturing device 100 acquires the differential images S3 to Sn.

Details of Operation Example of Image-Capturing Device

The description is now given of the details of the operation of the image-capturing device 100 according to the present embodiment. FIGS. 9A, 9B, 9C, 9D, and 9E are diagrams illustrated to describe in more detail the operation of the image-capturing device 100 according to the first embodiment of the present disclosure. Moreover, in FIGS.

9A, 9B, 9C, 9D, and 9E, the horizontal axis represents time. In addition, the description below is given that the unit pixel 1101 is simply as "pixel 1101" unless otherwise specified.

Figure 9:
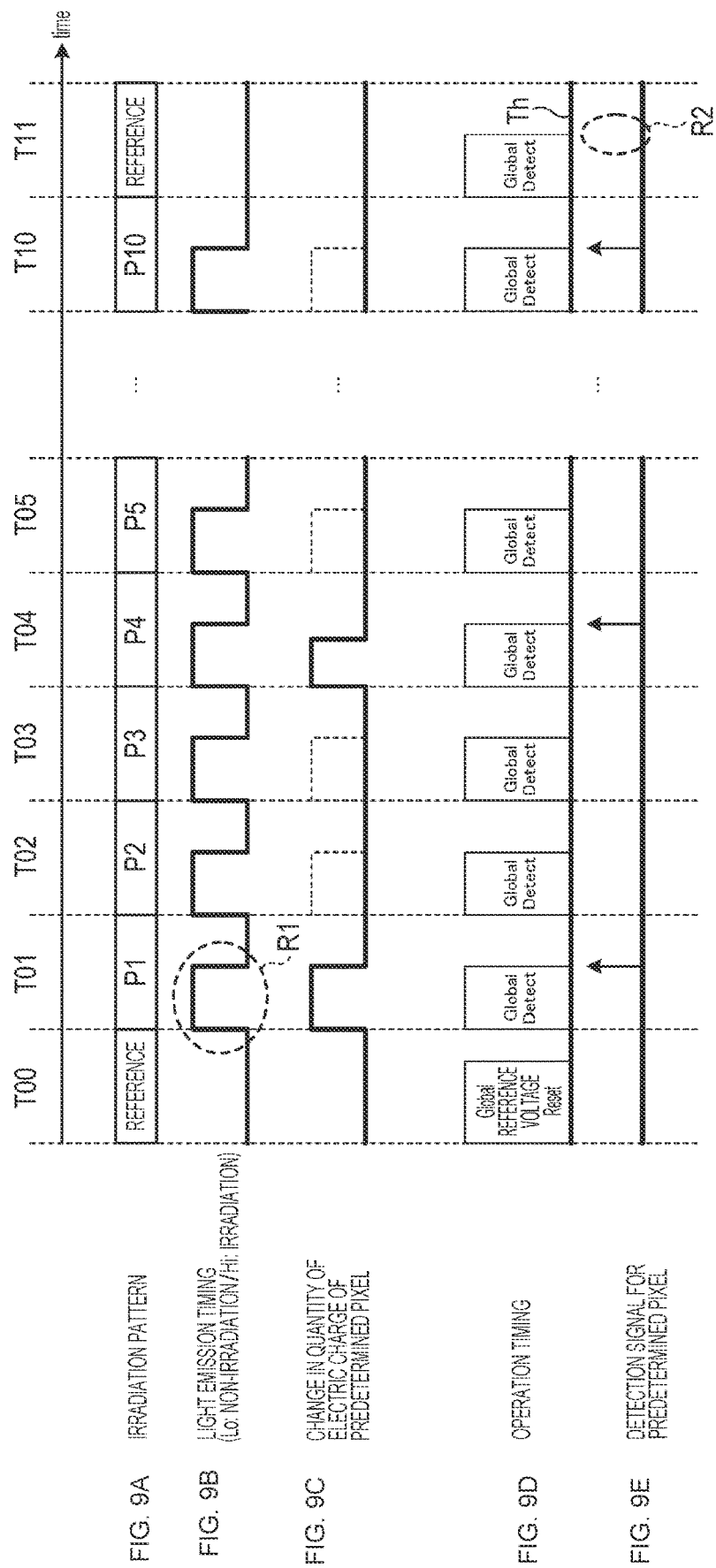
FIGS. 9A, 9B, 9C, 9D, and 9E are diagrams illustrated to describe in more detail the operation of the image-capturing device according to the first embodiment of the present disclosure.

FIG. 9A illustrates an irradiation pattern of the light applied by the projector 200. In the example of FIG. 9A, the projector 200 applies light using the background irradiation pattern P0 as a reference irradiation pattern. The projector 200 subsequently applies light using the respective irradiation patterns P1 to Pn−1 (where n=11 in the example of FIGS. 9A, 9B, 9C, 9D, and 9E) and finally applies light using a reference irradiation pattern (the background irradiation pattern P0) as the irradiation pattern Pn. Moreover, the projector 200 repeatedly applies light with the irradiation pattern illustrated in FIG. 9A, while the range-finding apparatus 1 calculates the distance to the to-be-measured object ob.

FIG. 9B illustrates the light emission timing by the projector 200. FIG. 9B illustrates that the light is applied (light emission) at High, and the light is not applied (non-irradiated) at Low. The projector 200 repeats High (irradiation) or Low (non-irradiation), for example, at a predetermined cycle. Moreover, the reference irradiation pattern is the background irradiation pattern P0 that does not apply light, so the projector 200 is Low (non-irradiation) in a period T00 corresponding to the reference irradiation pattern.

FIG. 9C targets a given pixel 1101 and illustrates an example of a change in the quantity of electric charge of the target pixel 1101. In one example, the quantity of electric charge of the target pixel 1101 irradiated with the light of the reference irradiation pattern by the projector 200 is set to Low. In the case where the projector 200 applies the irradiation light with a predetermined irradiation pattern, the intensity of light incident on the pixel 1101 that captures the area irradiated with the irradiation light is larger than the intensity of light incident on the target pixel 1101 in the case of being irradiated with the reference irradiation pattern. In this case, the quantity of electric charge generated in the target pixel 1101 is larger than the quantity of electric charge upon being irradiated with the reference irradiation pattern. In FIG. 9C, the quantity of electric charge increased from the time of being irradiated with the reference irradiation pattern is shown as High.

Moreover, in some cases, the target pixel 1101 captures a region not irradiated with the irradiation light depending on the irradiation pattern. In this case, the intensity of light incident on the target pixel 1101 is the same as the intensity of light incident on the target pixel 1101 upon being irradiated with the reference irradiation pattern, which makes the quantity of electric charge generated in the target pixel 1101 Low.

The irradiation pattern is a pattern including light-dark vertical stripes as described above. Thus, even if the target pixel 1101 captures a region not irradiated with the irradiation light, in some cases, other pixels 1101 capture a region irradiated with the irradiation light. The dotted line in FIG. 9C illustrates the quantity of electric charge generated by the other pixels 1101 that capture the region irradiated with the irradiation light. In this way, the quantity of electric charge generated for each of the plurality of pixels 1101 differs depending on the irradiation pattern.

FIG. 9D illustrates the operation timing and the threshold value Th (the reference voltage Vinit) of the image-capturing device 100. In FIG. 9D, the threshold value Th is represented by a solid line. In one example, when the projector 200 applies the light of the reference irradiation pattern in the period T00 (i.e., upon the non-irradiation), the image-capturing device 100 resets the threshold value Th (resetting global reference voltage). The image-capturing device 100 then performs a threshold value determination (global detect) in synchronization with the light emission timing of the projector 200 in the periods T01 to T11 and outputs a detection signal for each pixel 1101.

In one example, in the target pixel 1101, the quantity of electric charge increases in the case where the projector 200 applies light of the irradiation pattern P1, as illustrated in FIG. 9C. The image-capturing device 100 detects an increase in the quantity of electric charge and outputs a detection signal indicating the increase (upward arrow in FIG. 9E). Moreover, in one example, the image-capturing device 100 outputs "1" as the detection signal upon increasing the quantity of electric charge and outputs "0" in other cases.

Moreover, as illustrated in FIG. 9A, the projector 200 applies light with the same irradiation pattern as the reference irradiation pattern initially applied after being irradiated with the irradiation pattern P10. In this example, the projector 200 applies light with the background irradiation pattern P0 as the reference irradiation pattern. In other words, the projector 200 does not apply light in a period T11 (non-irradiation). The image-capturing device 100 performs the threshold value determination in the period T11 and outputs the detection signal. The detection signal in the period T11 is used in setting a confidence coefficient described later.

Further, the image-capturing device 100 according to the present embodiment resets the threshold value Th during the period T00 and, after that, does not reset the threshold value until the completion of the period T11. Thus, the threshold value Th of the image-capturing device 100 does not vary from the period T00 and remains Low to the period T11.

First Comparative Example of Image-Capturing Device

Figure 10:
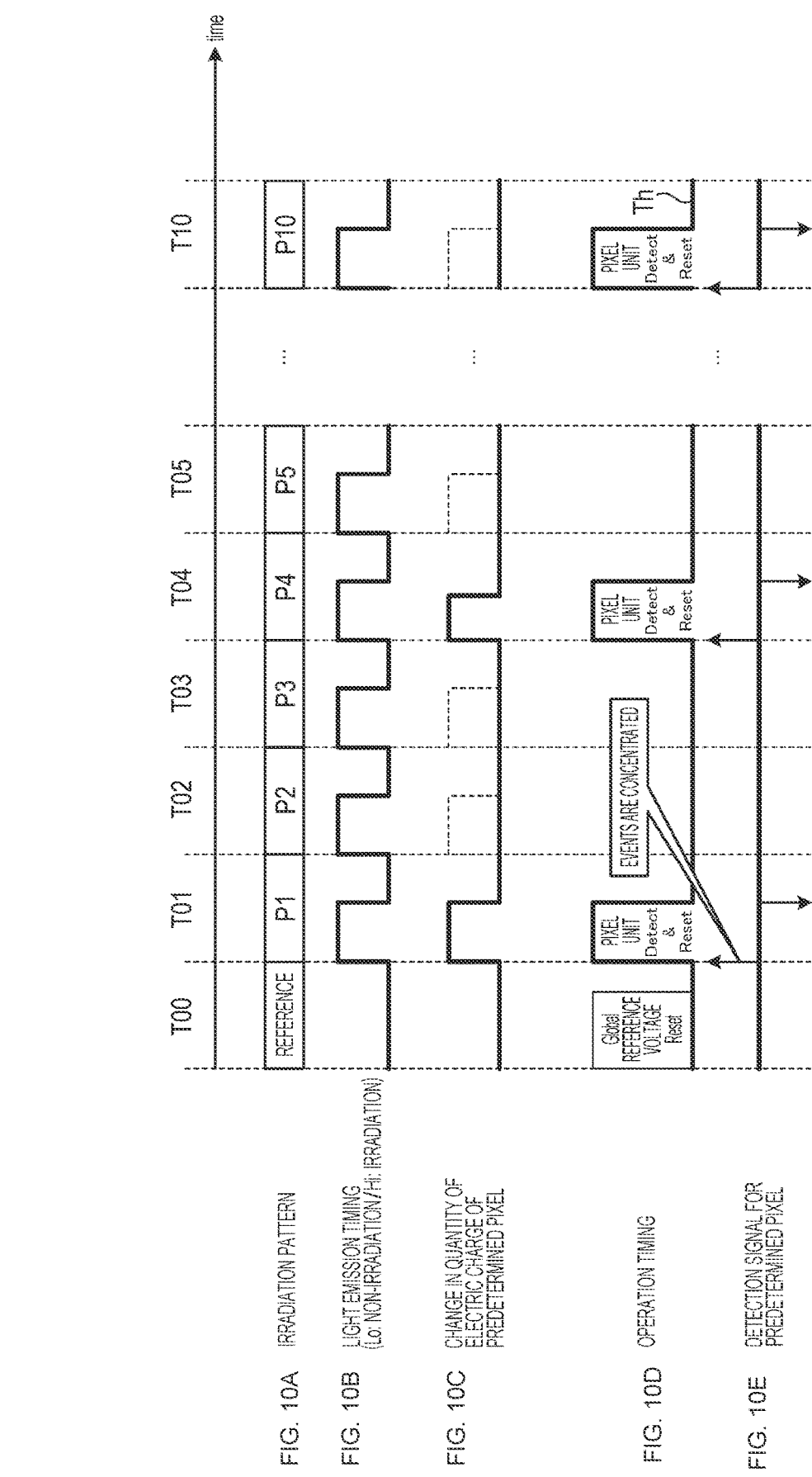
FIGS. 10A, 10B, 10C, 10D, and 10E are diagrams illustrated to describe a comparative example for the image-capturing device according to the first embodiment of the present disclosure.

The description is now given of a case of capturing a differential image using an asynchronous (arbiter-based) image-capturing device (DVS) as a first comparative example with reference to FIGS. 10A, 10B, 10C, 10D, and 10E. FIGS. 10A, 10B, 10C, 10D, and 10E are diagrams illustrated to describe the first comparative example of the image-capturing device 100 according to the first embodiment of the present disclosure. Moreover, FIGS. 10A, 10B, and 10C are identical to FIGS. 9A, 9B, and 9C, respectively, so the relevant description is omitted here. In addition, an image-capturing device according to the first comparative example includes a pixel array section 110, a control unit 111, and a signal processing unit 112, similarly to the image-capturing device 100 described with reference to FIG. 2. The control unit 111 and signal processing unit 112 are different in operation from the image-capturing device 100 according to the embodiment.

The image-capturing device according to the first comparative example is an asynchronous DVS and resets the threshold value Th for each threshold value determination operation. In other words, the image-capturing device according to the first comparative example outputs a detection signal at the occurrence of an event and resets the threshold value Th each time the detection signal is output.

In this case, as illustrated in FIGS. 10D and 10E, the image-capturing device of the first comparative example outputs a detection signal indicating that the quantity of electric charge has increased at the timing when a change in the quantity of electric charge of the target pixel 1101 becomes High and resets the threshold value Th. Thus, the threshold value Th changes from Low to High in the period T01, as represented by the solid line in FIG. 10D. The image-capturing device then outputs a detection signal (downward arrow in FIG. 10E) indicating that the quantity of electric charge has decreased at the timing when a change in the quantity of electric charge of the target pixel 1101 becomes Low and resets the threshold value Th. Thus, the threshold value Th changes from High to Low in the period T01, as represented by the solid line in FIG. 10D.

The image-capturing device outputs a detection signal indicating that the quantity of electric charge has changed in the periods T01, T04, and T10 in which the quantity of electric charge of the target pixel 1101 varies.

As described above, even the asynchronous DVS can detect a change in the quantity of electric charge of the target pixel 1101. However, in the range-finding apparatus 1, the projector 200 repeatedly applies light at a predetermined cycle to calculate the distance. Thus, events simultaneously occur in a large number of pixels 1101, and even the events are liable to be concentrated on the light emission timing of the projector 200. However, the traditional asynchronous DVS outputs the detection signal only when the event occurs, so the output interface (I/F) band of the DVS is set to narrow. Thus, if events are concentrated at a predetermined timing, the detection signal fails to be output at once at the predetermined timing, and the timing at which the DVS detects the change in the quantity of electric charge is likely to shift from the timing at which the detection signal is output, leading to the erroneous calculation of distance by the range-finding apparatus 1. In addition, in this case, it can be difficult to distinguish whether the erroneous calculation of distance is due to the concentration of events or the motion of the to-be-measured object ob.

Further, the image-capturing device resets the threshold value Th every time the threshold value is determined. Thus, if the threshold value determination is erroneous due to noise or the like, the threshold value Th can be erroneously reset, leading to erroneous threshold value determination made later.

Thus, in the present embodiment, the readout timing of the image-capturing device 100 is made synchronized with predetermined timing to output the detection signal using the scanning method that scans the pixels 1101 simultaneously. In addition, the present embodiment resets the threshold value Th of the image-capturing device 100 at the time of the first reference irradiation pattern irradiation and does not reset after that. This configuration makes it possible for the image-capturing device 100 according to the present embodiment to match the timing of detecting the change in the quantity of electric charge (the timing of the projector 200 emitting light in a predetermined irradiation pattern) with the timing of outputting the detection signal. In addition, it is possible for the image-capturing device 100 according to the present embodiment to further reduce the occurrence of erroneous determination upon the determination of threshold value.

Moreover, In FIGS. 9A, 9B, 9C, 9D, and 9E, the projector 200 applies the light of the same irradiation pattern as the reference irradiation pattern in the period T11. However, in the first comparative example, the threshold value Th is reset every time the threshold value is compared, so it fails to be used for setting a confidence coefficient even if the irradiation is performed in the period T11. Thus, in the first comparative example, the light emission of the reference irradiation pattern in the period T11 is omitted.

Second Comparative Example of Image-Capturing Device

Figure 11:
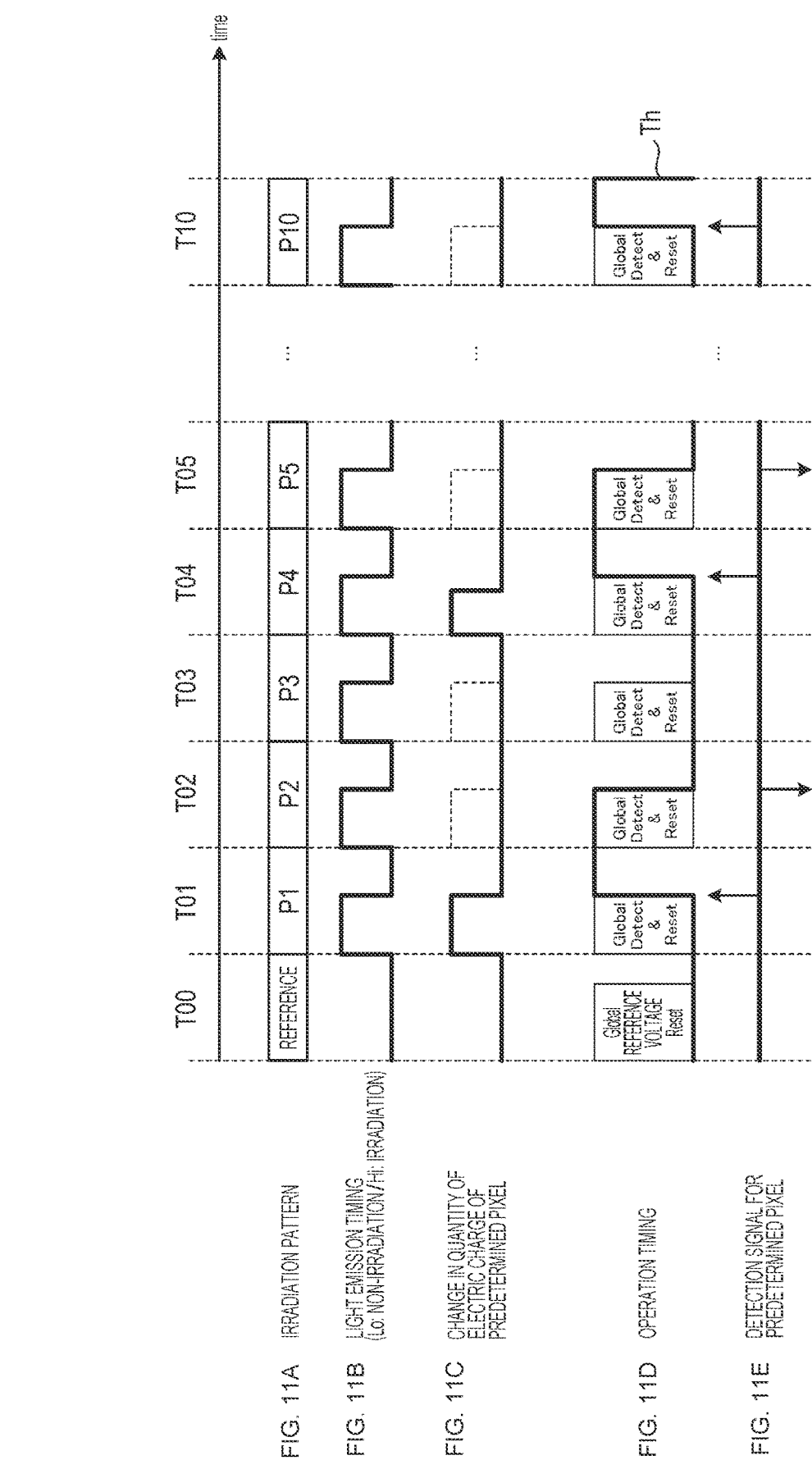
FIGS. 11A, 11B, 11C, 11D, and 11E are diagrams illustrated to describe a comparative example for the image-capturing device according to the first embodiment of the present disclosure.

The description is now given of a case of capturing a differential image using a synchronous (scan-based) image-capturing device (DVS) as a second comparative example with reference to FIGS. 11A, 11B, 11C, 11D, and 11E. FIGS. 11A, 11B, 11C, 11D, and 11E are diagrams illustrated to describe a comparative example for the image-capturing device 100 according to the first embodiment of the present disclosure. Moreover, FIGS. 11A, 11B, and 11C are identical to FIGS. 9A, 9B, and 9C, respectively, so the relevant description is omitted here. In addition, an image-capturing device according to the second comparative example includes a pixel array section 110, a control unit 111, and a signal processing unit 112, similarly to the image-capturing device 100 described with reference to FIG. 2. The control unit 111 and signal processing unit 112 are different in operation from the image-capturing device 100 according to the embodiment.

An image-capturing device 100B according to the second comparative example is a synchronous DVS and resets the threshold value Th for each threshold value determination. In other words, the image-capturing device 100B according to the second comparative example performs the threshold value determination, outputs a detection signal, and resets the threshold value Th in synchronization with the light emission timing of the projector 200.

In this case, as illustrated in FIGS. 11D and 11E, the image-capturing device outputs a detection signal indicating that the quantity of electric charge of the target pixel 1101 has increased in synchronization with the light emission timing of the projector 200, for example, in the period T01 and resets the threshold value Th. Thus, the threshold value Th changes from Low to High during the period T01, as represented by the solid line in FIG. 11D. In the following period T02, the image-capturing device of the second comparative example then outputs a detection signal indicating that the quantity of electric charge of the target pixel 1101 has decreased and resets the threshold value Th. Thus, the threshold value Th changes from High to Low during the period T02, as represented by the solid line in FIG. 11D.

As described above, even the image-capturing device operating as a synchronous DVS is possible to detect the change in the quantity of electric charge of the pixel 1101. However, the image-capturing device resets the threshold value Th each time the threshold value is determined, so this image-capturing device will output a detection signal indicating that the quantity of electric charge has decreased during the period T02 in which the quantity of electric charge has not changed. Furthermore, in the image-capturing device, if the threshold value determination is erroneous due to noise or the like, the threshold value Th can be erroneously reset, leading to erroneous threshold value determination made later.

Therefore, the present embodiment resets the threshold value Th of the image-capturing device 100 at the time of the first reference irradiation pattern irradiation and does not reset after that. This configuration makes it possible for the image-capturing device 100 according to the present embodiment to match the timing of detecting the change in the quantity of electric charge (the timing of the projector 200 emitting light in a predetermined irradiation pattern) with the timing of outputting the detection signal. In addition, it is possible for the image-capturing device 100 according to the present embodiment to further reduce the occurrence of erroneous determination upon the determination of threshold value.

Moreover, In FIGS. 9A, 9B, 9C, 9D, and 9E, the projector 200 applies the light of the same irradiation pattern as the reference irradiation pattern in the period T11. However, in the second comparative example, the threshold value Th is reset every time the threshold value is compared, so it fails to be used for setting a confidence coefficient even if the irradiation is performed in the period T11. Thus, in the second comparative example, the light emission of the reference irradiation pattern in the period T11 is omitted.

Other Challenges in Comparative Examples

Figure 12:
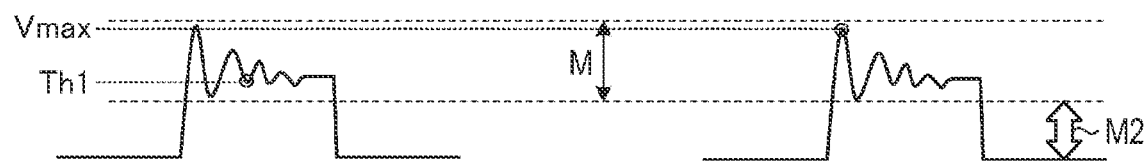
FIG. 12 is a schematic diagram illustrating an example of ringing in a projector.

The description is now given of other challenges in the first and second comparative examples mentioned above with reference to FIG. 12. The projector 200 on the side of the light source has a ringing effect at the light emission. FIG. 12 is a schematic diagram illustrating an example of the ringing of the projector 200. For example, R1 in FIG. 9B is enlarged and illustrated in FIG. 12.

Due to the influence of ringing on the side of the projector 200, the voltage signal corresponding to the quantity of electric charge of the pixel 1101 on the side of the optical receiver also has the ringing effect. In the above-described first and second comparative examples, the image-capturing device of the first and second comparative examples resets the threshold value Th (the voltage signal Vinit) every time the threshold value is determined. Even if the synchronization with the light emission timing of the projector 200 is possible, typically, it is significantly difficult to synchronize with the ringing phase. The image-capturing device according to the first and second comparative examples necessitates the management of the timing for resetting the threshold value Th after performing the threshold value determination, but as described above, such timing management is difficult due to the ringing of the projector 200.

Thus, the value of the threshold value Th is likely to vary depending on the timing at which the image-capturing device of the first or second comparative example resets the threshold value Th. In one example, the left-handed view of FIG. 12 indicates that the image-capturing device of the first or second comparative example resets the valleys of the wave due to ringing as the threshold value Th1 in the light emission at a given light emission timing. Then, at the subsequent light emission timing, the right-handed view of FIG. 12 indicates that the image-capturing device of the first and second comparative examples detects a voltage signal corresponding to the quantity of electric charge. In this case, the image-capturing device of the first or second comparative example outputs a comparison result obtained by comparing the threshold value Th1 with the maximum value Vmax of the voltage signal at the peak of the ringing wave in the light emission due to the light emission timing. Thus, even though the projector 200 actually emits light with the same intensity of light, the image-capturing device of the first and second comparative examples will erroneously determine that the pixel 1101 has a larger quantity of electric charge and is brighter.

The prevention of such an erroneous determination necessitates giving a predetermined margin M to the threshold value Th to widen the detection threshold value. Thus, as indicated as M2 (the portion indicated by the void arrow) in FIG. 12, the signal amplitude of the voltage signal used for the threshold value determination is smaller, which decreases the signal-to-noise (S/N) ratio.

On the other hand, the image-capturing device 100 according to the present embodiment resets the threshold value Th at the time of applying the light of the initial reference irradiation pattern and does not reset after that, as described above. This configuration makes it possible for the image-capturing device 100 according to the present embodiment to set the threshold value Th without being affected by the ringing on the side of the projector 200, so preventing or reducing the decrease in the S/N ratio.

<1.3. Control Unit of Range-Finding Apparatus>

Figure 13:
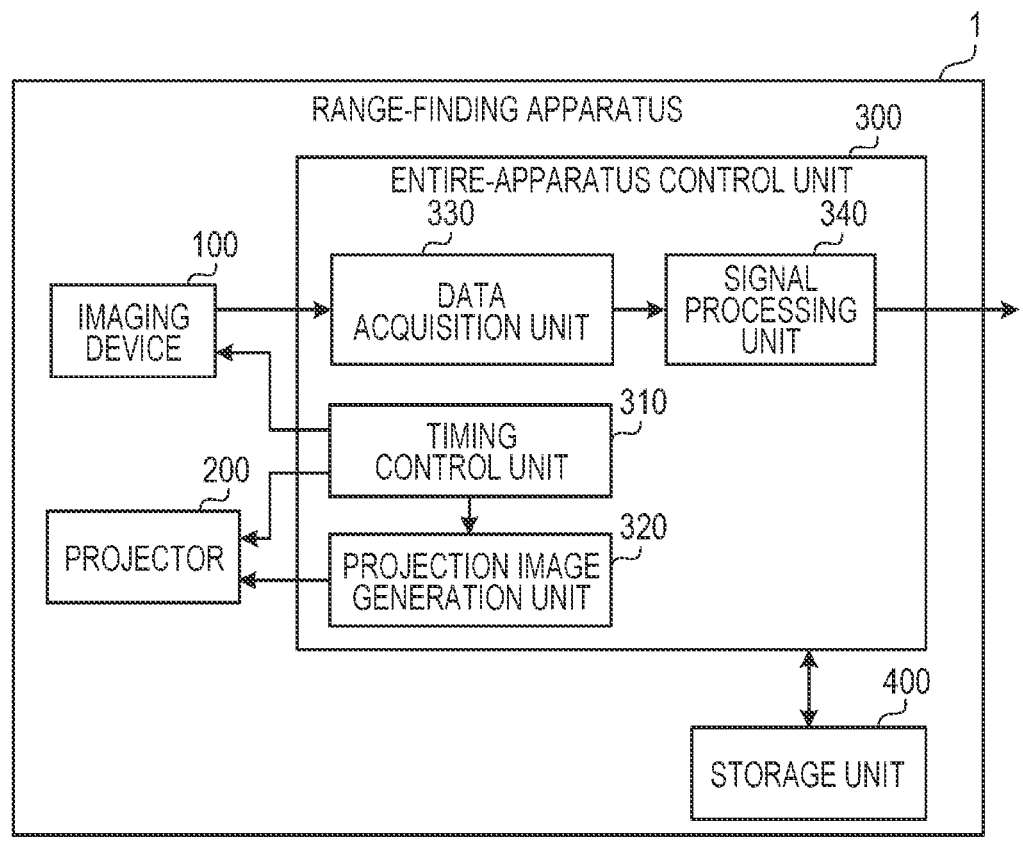
FIG. 13 is a block diagram illustrating an exemplary configuration of a range-finding apparatus according to the first embodiment of the present disclosure.

Next, details of the entire-apparatus control unit 300 of the range-finding apparatus 1 according to the present embodiment will be described. FIG. 13 is a block diagram illustrating an exemplary configuration of a range-finding apparatus 1 according to the first embodiment of the present disclosure.

The entire-apparatus control unit 300 is implemented by, for example, a central processing unit (CPU) or micro processing unit (MPU), or the like running a program stored in the range-finding apparatus 1 with random-access memory (RAM) or the like used as a work area. In addition, the entire-apparatus control unit 300 is a controller and can be constructed by an integrated circuit such as an application-specific integrated circuit (ASIC) or field-programmable gate array (FPGA).

The entire-apparatus control unit 300 has a timing control unit 310, a projection image generation unit 320, a data acquisition unit 330, and a signal processing unit 340, as illustrated in FIG. 13. The entire-apparatus control unit 300 achieves or executes the functions and operations of information processing described below. Moreover, the entire-apparatus control unit 300 has an internal configuration, which is not limited to that illustrated in FIG. 13. The entire-apparatus control unit 300 can be any other configuration as long as it performs information processing described later. Moreover, the entire-apparatus control unit 300 can be connected to a predetermined network by wired or wirelessly using, for example, a network interface card (NIC) to receive various types of information from an external server or the like via the network.

(Timing Control Unit)

The timing control unit 310 controls the projection image generation unit 320 so that the projection image generation unit 320 controls the irradiation pattern of the irradiation light emitted from the projector 200. In addition, the timing control unit 310 controls the projector 200 and the image-capturing device 100 to control the irradiation timing of the irradiation light by the projector 200 and the image capturing timing by the image-capturing device 100, respectively.

Figure 14:
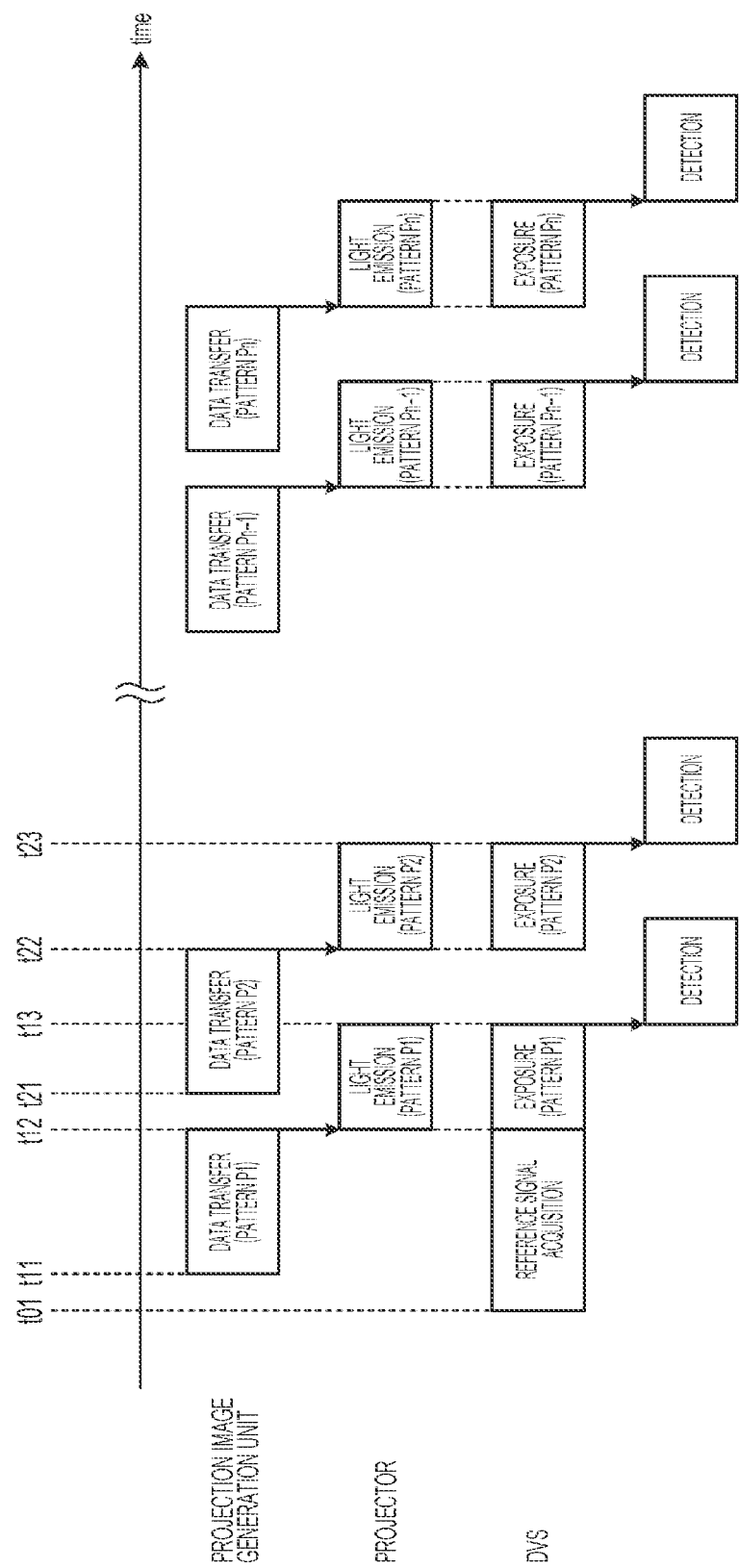
FIG. 14 is a diagram illustrated to describe an example of timing control by a timing control unit according to the first embodiment of the present disclosure.

FIG. 14 is a diagram illustrated to describe an example of timing control by a timing control unit 310 according to the first embodiment of the present disclosure.

In the example illustrated in FIG. 14, the timing control unit 310 controls the image-capturing device 100 (corresponding to the DVS in FIG. 14) so that the image-capturing device 100 performs image capturing for the irradiation pattern P0 and acquires the voltage signal Vinit (corresponds to the reference signal in FIG. 14). The irradiation pattern P0 is a background irradiation pattern that does not use light emission from the projector 200 as described above, so the projection image generation unit 320 and the projector 200 do not operate. The timing control unit 310 controls the image-capturing device 100 so that the image-capturing device 100 exposes the background light (the irradiation pattern P0) from time t01 to time t12 while the projector 200 does not emit light, and acquires the voltage signal Vinit.

The timing control unit 310 controls the projection image generation unit 320 so that the projection image generation unit 320 transfers the data of the irradiation patterns P1 to the projector 200 from time t11 to time t12. Furthermore, the timing control unit 310 controls the projector 200 so that the projector 200 emits the irradiation light of the irradiation pattern P1 from time t12 to time t13. Furthermore, the timing control unit 310 controls the image-capturing device 100 so that the image-capturing device 100 performs the exposure from time t12 to time t13, and detects presence or absence of an event after time t13.

The timing control unit 310 controls the projection image generation unit 320 so that the projection image generation unit 320 transfers the data of the irradiation patterns P2 to the projector 200 from time t21 to time t22. Furthermore, the timing control unit 310 controls the projector 200 so that the projector 200 emits the irradiation light of the irradiation pattern P2 from time t22 to time t23. Furthermore, the timing control unit 310 controls the image-capturing device 100 so that the image-capturing device 100 performs the exposure from time t22 to time t23, and detects presence or absence of an event after time t23. Moreover, as illustrated in FIG. 14, the time t21 is a time point between the time t12 and the time t13. In addition, the time t22 is a time point after the time t13. In this way, the timing control unit 310 starts the data transfer of the irradiation pattern P2 before the time t13, so it is possible to shorten the interval of the light emission of the projector 200 and the exposure of the image-capturing device 100.

Similarly, the timing control unit 310 controls the projection image generation unit 320, the projector 200, and the image-capturing device 100 so that the irradiation patterns P3 to Pn are emitted and accordingly, the differential images S3 to Sn are captured.

Moreover, in the case where the irradiation pattern Pn is the same background irradiation pattern as the irradiation pattern P0, the data transfer of the irradiation pattern Pn by the projection image generation unit 320 and the light emission by the projector 200 can be omitted.

(Projection Image Generation Unit)

Referring again to FIG. 13, the projection image generation unit 320 transfers, for example, the data of the irradiation pattern stored in the storage unit 400 to the projector 200 in accordance with the control of the timing control unit 310. The description is now given for a case of using the irradiation pattern disclosed in Non-Patent Document 1 as the projection image (irradiation pattern) generated by the projection image generation unit 320.

Figure 15:
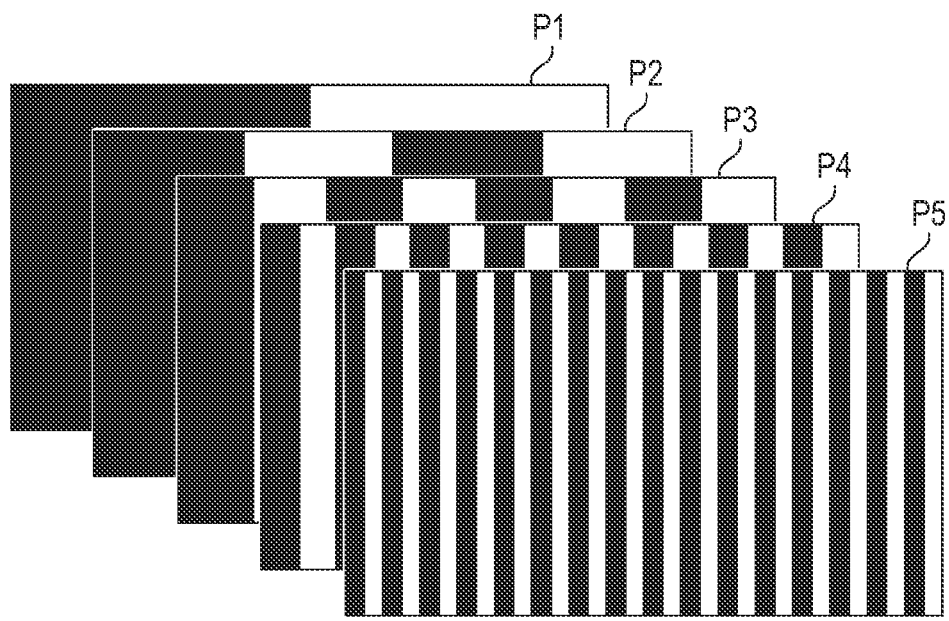
FIG. 15 is a diagram illustrated to describe an example of an irradiation pattern transferred by a projection image generation unit according to the first embodiment of the present disclosure.
Figure 16:
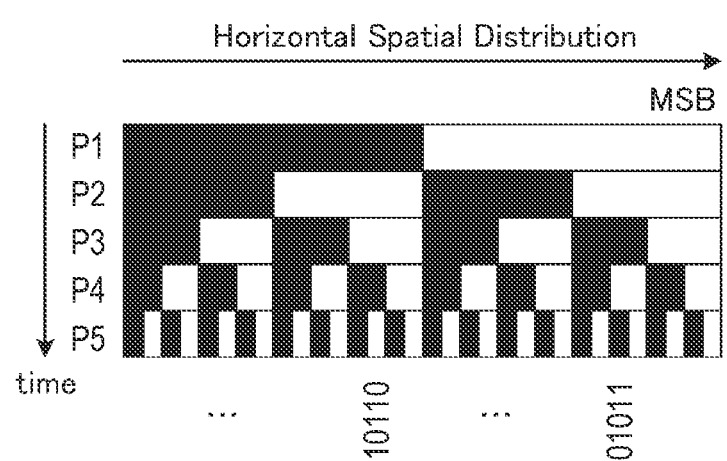
FIG. 16 is a diagram illustrated to describe an example of an irradiation pattern transferred by a projection image generation unit according to the first embodiment of the present disclosure.

FIGS. 15 and 16 are diagrams illustrated to describe an example of an irradiation pattern transferred by a projection image generation unit 320 according to the first embodiment of the present disclosure.

The projection image generation unit 320 transfers the irradiation patterns P1 to Pn to the projector 200. In FIG. 15, the projection image generation unit 320 transfers the irradiation patterns P1 to P5 to the projector 200.

The irradiation pattern P1 is a two-color pattern with black (dark) on the left side of a pattern image and white (bright) on the right side, as illustrated in FIG. 15. The irradiation pattern P2 is a pattern in which two black vertical stripes and two white vertical stripes are alternately arranged one by one. An irradiation pattern Pm is a pattern in which $2^{(m-1)}$ black vertical stripes and $2^{(m-1)}$ white vertical stripes are alternately arranged one by one.

The irradiation patterns P1 to Pn are binary-coded pattern images in this way. The irradiation patterns P1 to Pn are coded as "00000", "00001", and so on in order from the left side of the pattern image if the black stripes are "0" and the white stripes are "1", as illustrated in FIG. 16. Moreover, the irradiation patterns P1 to Pn are arranged vertically in FIG. 16. In FIG. 16, the downward arrow represents the time, and the horizontal arrow represents the black and white horizontal spatial distribution. In FIG. 16, the left side is the least significant bit (LSB), and the right side is the most significant bit (MSB).

In this way, the binary code is associated with each stripe in the horizontal direction of each irradiation pattern. In other words, the irradiation pattern can be binary-coded for each irradiation angle of light by the projector 200 in the horizontal direction.

The projection image generation unit 320 is herein intended to transfer the data of the irradiation pattern identical to the background irradiation pattern (irradiation pattern P0), for example, as the last irradiation pattern Pn. In this case, the irradiation patterns P0 and Pn are all black shading patterns (projection images). In this instance, the differential image Sn corresponding to the irradiation pattern Pn is used to calculate a confidence coefficient by the signal processing unit 340. The calculation of the confidence coefficient is described later in detail.

Moreover, the irradiation patterns illustrated in FIGS. 15 and 16 are examples, and the patterns are not limited to the illustrated ones. Any pattern can be used as long as it is a pattern in which binary coding is subjected so that the pixels corresponding to the captured images S0 to Sn are identifiable. In one example, a light-dark pattern of horizontal stripes, rather than vertical stripes, can be used.

(Data Acquisition Unit)

Referring again to FIG. 13, the data acquisition unit 330 acquires the differential images S1 to Sn captured by the image-capturing device 100. The data acquisition unit 330 acquires the differential images S1 to Sn and acquires information regarding the timing (frame ID) at which each image is captured. The data acquisition unit 330 outputs the acquired differential images S1 to Sn and timing information to the signal processing unit 340. The data acquisition unit 330 can function as, for example, a frame buffer for storing the differential images S1 to Sn.

(Signal Processing Unit)

The signal processing unit 340 calculates the distance (depth) to the to-be-measured object ob and the confidence coefficient for the distance, on the basis of the captured images S1 to Sn acquired by the data acquisition unit 330 and information regarding calibration. The calibration information is, for example, information corresponding to the optical system and the geometric position of the image-capturing device 100 and the projector 200, and is information acquired in advance by calibration. The calibration information can be stored in advance, for example, in the storage unit 400.

Figure 17:
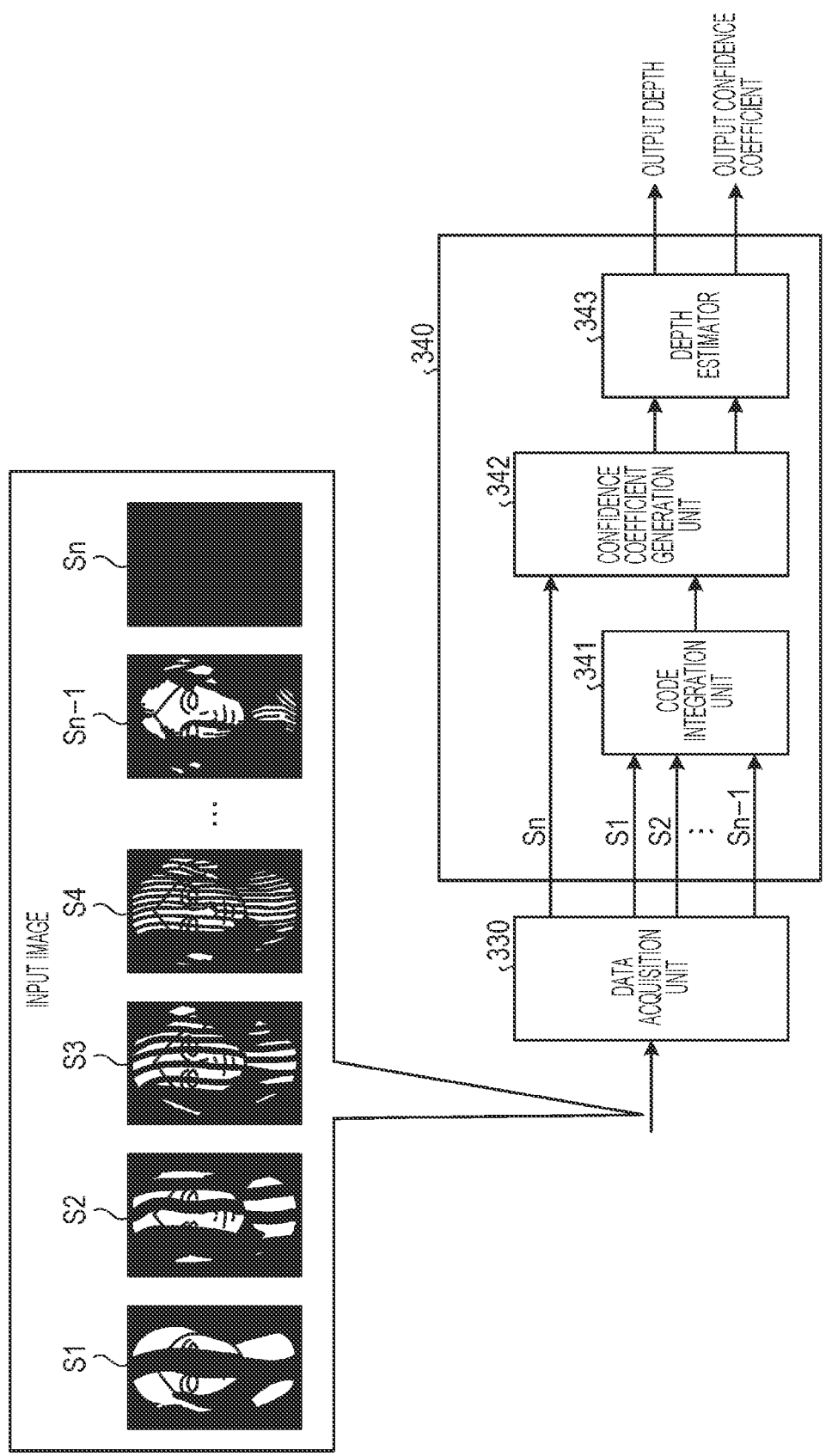
FIG. 17 is a block diagram illustrating an exemplary configuration of a signal processing unit according to the first embodiment of the present disclosure.

FIG. 17 is a block diagram illustrating an exemplary configuration of a signal processing unit 340 according to the first embodiment of the present disclosure. The signal processing unit 340 includes a code integration unit 341, a confidence coefficient generation unit 342, and a depth estimator 343.

The data acquisition unit 330, when acquiring the differential images S1 to Sn from the image-capturing device 100, outputs the differential image Sn to the confidence coefficient generation unit 342, as illustrated in FIG. 17. In addition, the data acquisition unit 330 outputs the differential images S1 to Sn−1 to the code integration unit 341.

(Code Integration Unit)

The code integration unit 341 integrates values of the respective pixels of the differential images S1 to Sn−1 into one code. Each pixel of the differential image S1 to Sn−1 indicates a difference from the background image (reference signal), and the irradiation pixel is represented by "1", and the non-irradiated pixel is represented by "0". Thus, for example, in the case where all the corresponding pixels of the differential images S1 to Sn−1 are non-irradiated pixels, the code integration unit 341 integrates values of the pixels into "00 . . . 0". The code integration unit 341 can be a generation unit that integrates the differential images S1 to Sn−1 to generate an image with a pixel value of an n−1 bit (hereinafter also referred to as an integrated image).

Moreover, in the range-finding apparatus of the related art, an image-capturing device outputs a captured image with a pixel value of 10 bits as a captured image corresponding to an irradiation pattern. Thus, a code integration unit in the related art needs to determine whether each pixel of the captured image is an irradiation pixel or a non-irradiated pixel using a threshold value.

However, the image-capturing device 100 according to the present embodiment determines whether each pixel of the captured image is an irradiation pixel or a non-irradiated pixel by a threshold value (reference signal) and outputs the result as the differential images S1 to Sn−1. Thus, the threshold value processing on the differential images S1 to Sn−1 can be omitted in the code integration unit 341 according to the present embodiment, and the code integration is sufficient.

(Confidence Coefficient Generation Unit)

The confidence coefficient generation unit 342 calculates a confidence coefficient of each pixel of the integrated image generated by the code integration unit 341. In the range-finding apparatus of the related art, a code integration unit determines whether each pixel is bright or dark by a threshold value, as described above. Thus, if the determination with a threshold value is difficult for a pixel having a pixel value approximating the threshold value, the code integration unit lowers the level of the confidence coefficient of the pixel to prevent the depth calculation from being indeterminate.

On the other hand, in the present embodiment, the image-capturing device 100 determines whether each pixel is bright or dark by a threshold value, and the code integration unit 341 does not perform such determination. Thus, in the present embodiment, the confidence coefficient generation unit 342 is intended to calculate the confidence coefficient of each pixel on the basis of the differential images S1 to Sn. Moreover, the confidence coefficient generation unit 342 outputs the integrated image generated by the code integration unit 341 and the calculated confidence coefficient to the depth estimator 343.

First Example of Confidence Coefficient Calculation

The description is given of an example in which the confidence coefficient generation unit 342 calculates the confidence coefficient. Even if the projector 200 emits light, the brightness of the reflected light on the to-be-measured object ob is smaller as the distance from the projector 200 to the to-be-measured object ob is longer. Thus, even if the projector 200 is located to emit light, in some cases, the pixel signal does not exceed the threshold value (reference signal), and the result obtained by detection is "0" (dark).

Thus, in a case where the luminance values of respective pixels of the differential images S1 to Sn−1 are "0" for all of the differential images, the confidence coefficient generation unit 342 sets the confidence coefficient value of the relevant pixel to the lowest value (e.g., zero). In this case, the projection image generation unit 320 can apply the light of, for example, an all-white irradiation pattern as one of the irradiation patterns P1 to Pn−1.

Second Example of Confidence Coefficient Calculation

The image-capturing device 100 according to the present embodiment is capable of capturing the differential images S1 to Sn−1 at high speed. Thus, it is possible for the range-finding apparatus 1 to calculate the distance to the to-be-measured object ob even if the to-be-measured object ob moves to some extent. However, for example, if the to-be-measured object ob moves at high speed, in some cases, the distance calculation (sensing) will fail. Thus, the confidence coefficient generation unit 342 sets the confidence coefficient of a position (pixel) where the to-be-measured object ob has moved significantly to be a low value.

As described above, the irradiation pattern Pn is the same irradiation pattern as the irradiation pattern P0 that is a background irradiation (non-irradiated) pattern. Thus, in a case where there is no change in the to-be-measured object ob upon applying light of the irradiation pattern P0 and the upon applying light of the irradiation pattern Pn, the pixel values of respective pixels of the differential image Sn are all "0". On the other hand, if there is a change in motion of the to-be-measured object, such as when the to-be-measured object ob moves, the pixel value of the position where the differential image Sn has changed is switched into "1". Thus, the confidence coefficient generation unit 342 sets the confidence coefficient of the pixel with the pixel value of the differential image Sn of "1" to be a low value, for example, the lowest value.

Moreover, the confidence coefficient generation unit 342 can calculate each confidence coefficient described in the first and second confidence coefficient calculation examples for each pixel or can calculate the confidence coefficient of either one of the first and second confidence coefficient calculation examples for each pixel. Alternatively, one confidence coefficient can be calculated for each pixel by subtracting the values calculated using the first and second confidence coefficient calculation examples from the predetermined reference confidence coefficient.

Further, the confidence coefficient calculation examples described above are illustrative, and the confidence coefficient generation unit 342 can calculate the confidence coefficient using a method other than the confidence coefficient calculation examples described earlier.

(Depth Estimator)

Referring again to FIG. 13, the depth estimator 343 estimates the distance (depth) to the to-be-measured object ob on the basis of the integrated image. As described above, the irradiation patterns P1 to Pn−1 of the projector 200 are binary coded for each irradiation angle. Thus, the depth estimator 343 is capable of associating each pixel with the irradiation angle of the projector 200 by decoding each pixel value of the integrated image.

The depth estimator 343 uses the irradiation angle of the projector 200 for each pixel and an internal or external parameter of the image-capturing device 100 to acquire the distance (depth information) to the to-be-measured object ob. The internal or external parameter is acquired in advance by calibration (corresponding to the calibration information mentioned above).

Figure 18:
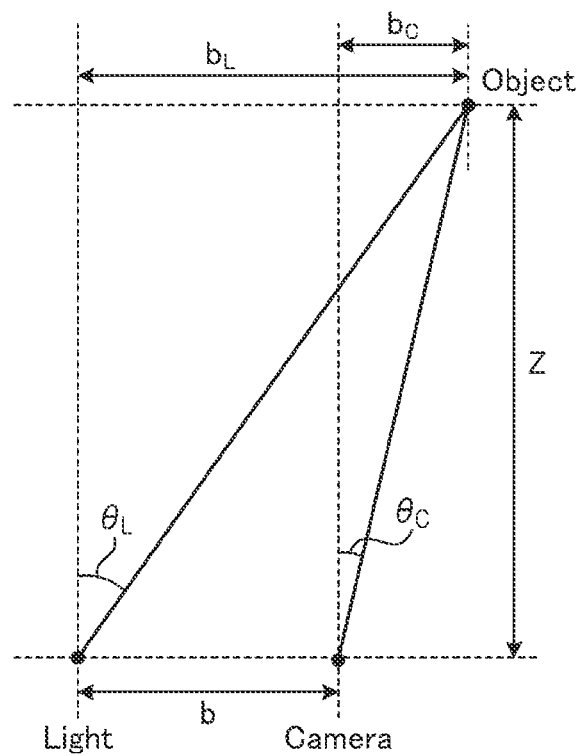
FIG. 18 is a diagram illustrated to describe a way to calculate a depth by a depth estimator according to the first embodiment of the present disclosure.

Here, FIG. 18 is a diagram illustrated to describe a way to calculate a depth by a depth estimator 343 according to the first embodiment of the present disclosure. As illustrated in FIG. 18, an irradiation angle when the projector 200 (corresponding to Light in FIG. 18) irradiates the to-be-measured object ob (corresponding to Object in FIG. 18) is given to $\theta_L$. An observation angle when the to-be-measured object ob is viewed from the image-capturing device 100 (corresponding to Camera in FIG. 18) is given to $\theta_c$. Given that a distance b from the projector 200 to the image-capturing device 100 is used as the calibration information, the depth estimator 343 calculates a depth Z using Formula (7) as below.

[Math. 2]

$$Z = \frac{b}{\tan(\theta_L) - \tan(\theta_C)} \quad (7)$$

Referring again to FIG. 13, the depth estimator 343 outputs calculated depth Z as an output depth. In addition, the depth estimator 343 outputs the confidence coefficient set by the confidence coefficient generation unit 342 as an output confidence coefficient in association with the calculated depth Z.

<1.4. Exemplary Operation of Range-Finding Apparatus>

Figure 19:
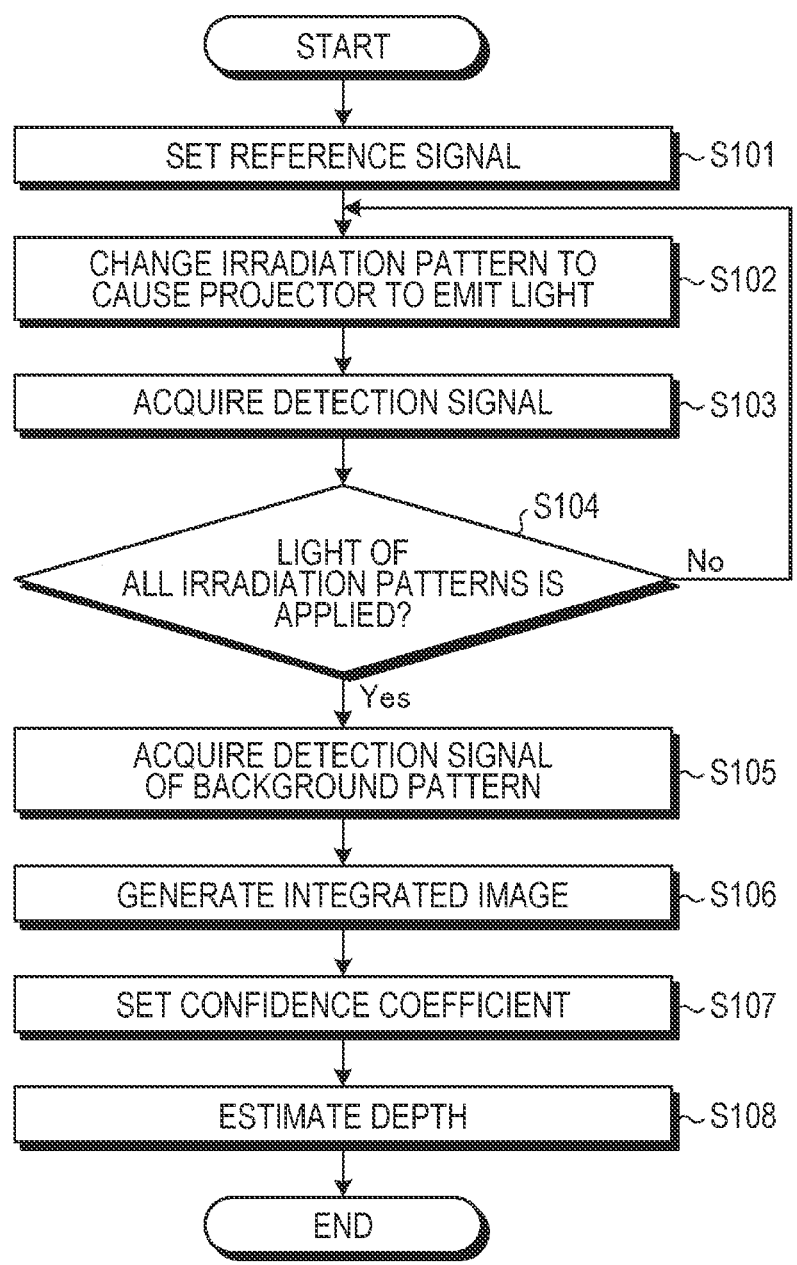
FIG. 19 is a flowchart illustrating an exemplary schematic operation of the range-finding apparatus according to the first embodiment of the present disclosure.

FIG. 19 is a flowchart illustrating an exemplary schematic operation of the range-finding apparatus 1 according to the first embodiment of the present disclosure. Moreover, the range-finding apparatus 1 can repeatedly execute the operation illustrated in FIG. 19 while measuring the distance to the to-be-measured object ob.

As illustrated in FIG. 19, the range-finding apparatus 1 sets the reference signal (the voltage signal Vinit) upon applying the light of the irradiation pattern P0, which is the background (non-irradiation) pattern (step S101).

Next, the range-finding apparatus 1 changes the irradiation pattern to cause the projector 200 to emit light (step S102) and then acquires a detection signal (step S103). The range-finding apparatus 1 determines whether or not the light of all the irradiation patterns of the irradiation patterns P1 to Pn−1 is applied (step S104). If the light of all the irradiation patterns is not applied (No in step S104), the processing returns to step S102.

If the light of all the irradiation patterns is applied (Yes in step S104), the range-finding apparatus 1 acquires the detection signal in the same irradiation pattern Pn (background pattern) as the background irradiation pattern (step S105).

The range-finding apparatus 1 integrates the acquired detection signal to generate an integrated image (step S106). The range-finding apparatus 1 then sets the confidence coefficient of each pixel on the basis of the differential images S1 to Sn (step S107). The range-finding apparatus 1 estimates the depth of each pixel on the basis of the integrated image (step S108).

As described above, the range-finding apparatus 1 according to the present embodiment, when resetting the reference signal upon applying the light of irradiation pattern P0 (non-irradiation), acquires the differential images S1 to Sn without resetting the reference signal after that. Thus, it is possible for the range-finding apparatus 1 to acquire a differential image indicating the difference from the background image at a higher speed.

In one example, given that the time of a frame rate of 120 frames per second (FPS) is used to acquire a 10-bit captured image. In addition, given that the range-finding apparatus 1 acquires 10 pieces of captured images in addition to the background for calculating the distance.

In the range-finding apparatus of the related art, it intends to acquire a 10-bit captured image as a captured image other than the background. In this case, if the range-finding apparatus of the related art is used to acquire a total of 11 pieces of captured images including the background image, it takes time at a frame rate of 11 FPS. Thus, the to-be-measured object ob or the image-capturing device is more likely to move from when the range-finding apparatus of the related art first acquires the background image to when it acquires the last captured image, which makes the higher precision calculation of distance difficult. In addition, the range-finding apparatus of the related art takes a relatively long time to acquire the captured image, which makes the time for distance calculation difficult to shorten.

On the other hand, the image-capturing device 100 according to the present embodiment is a DVS, so it has the performance of 1000 FPS or more. Thus, the range-finding apparatus 1 is capable of acquiring the differential images S1 to Sn at a higher speed. Thus, it is unlikely that the to-be-measured object ob or the image-capturing device will move from the time when the range-finding apparatus 1 acquires an initial differential image to the time when the range-finding apparatus 1 acquires the last differential image, and so it is possible to calculate the distance with higher accuracy. In addition, it is possible to significantly shorten the time taken for the range-finding apparatus 1 to calculate the distance.

2. Second Embodiment

According to the first embodiment described above, the description above is given for the case the range-finding apparatus 1 measures the distance to the to-be-measured object ob. Besides the above example, the range-finding apparatus 1 can acquire an RGB captured image in addition to the distance measurement. Thus, according to a second embodiment, the description is given for an example in which the range-finding apparatus 1 acquires an RGB captured image in addition to measuring the distance to the to-be-measured object ob.

<2.1. Exemplary Functional Configuration of Image-Capturing Device>

Figure 20:
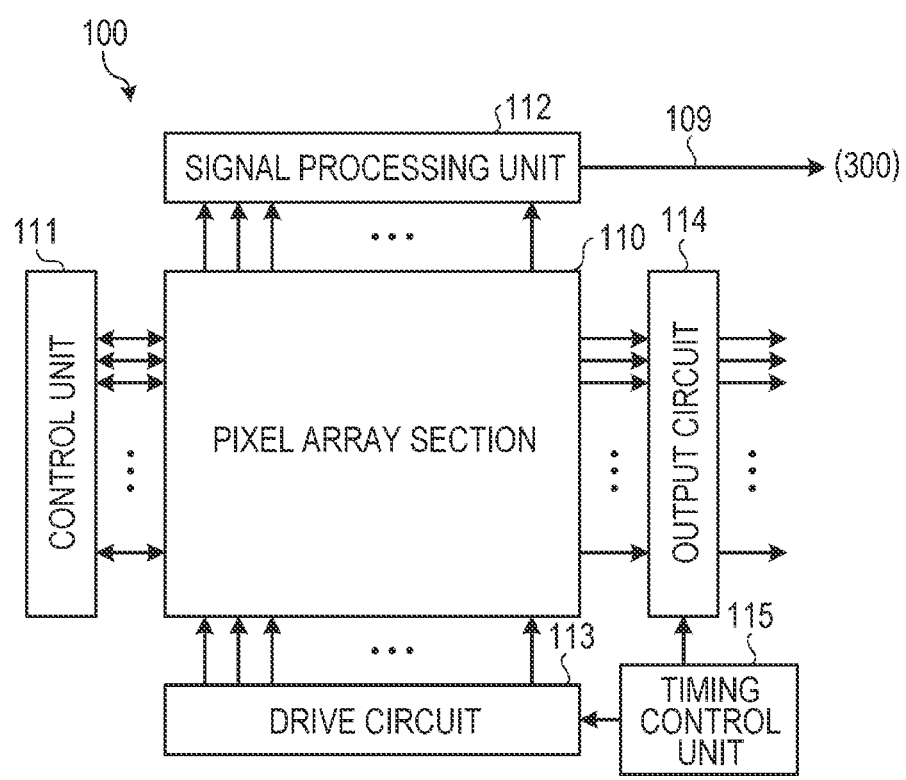
FIG. 20 is a diagram illustrating an exemplary functional configuration of an image-capturing device according to a second embodiment of the present disclosure.

FIG. 20 is a diagram illustrating an exemplary functional configuration of an image-capturing device 100 according to the second embodiment of the present disclosure. The image-capturing device 100 according to the present embodiment has a drive circuit 113, an output circuit 114, and a timing control unit 115, which are used to acquire a luminance value (pixel signal) for an RGB image, in addition to the functional configuration of the image-capturing device 100 illustrated in FIG. 2.

The drive circuit 113 includes a shift register, an address decoder, and the like and drives each unit pixel 1101 of a pixel array section 110. The electric signal output from each unit pixel 1101 in the column selectively scanned by the drive circuit 113 is input to the output circuit 114 through each output signal line. The output circuit 114 includes a column AD and the like and outputs the electric signal input from each unit pixel 1101 as a pixel signal to an external storage unit 400 or the entire-apparatus control unit 300.

The timing control unit 115 includes a timing generator and the like that generate various types of timing signals and controls the drive circuit 113 and the output circuit 114 on the basis of the various types of timing signals generated by the timing generator.

<2.2. Exemplary Configuration of Unit Pixel>

Figure 21:
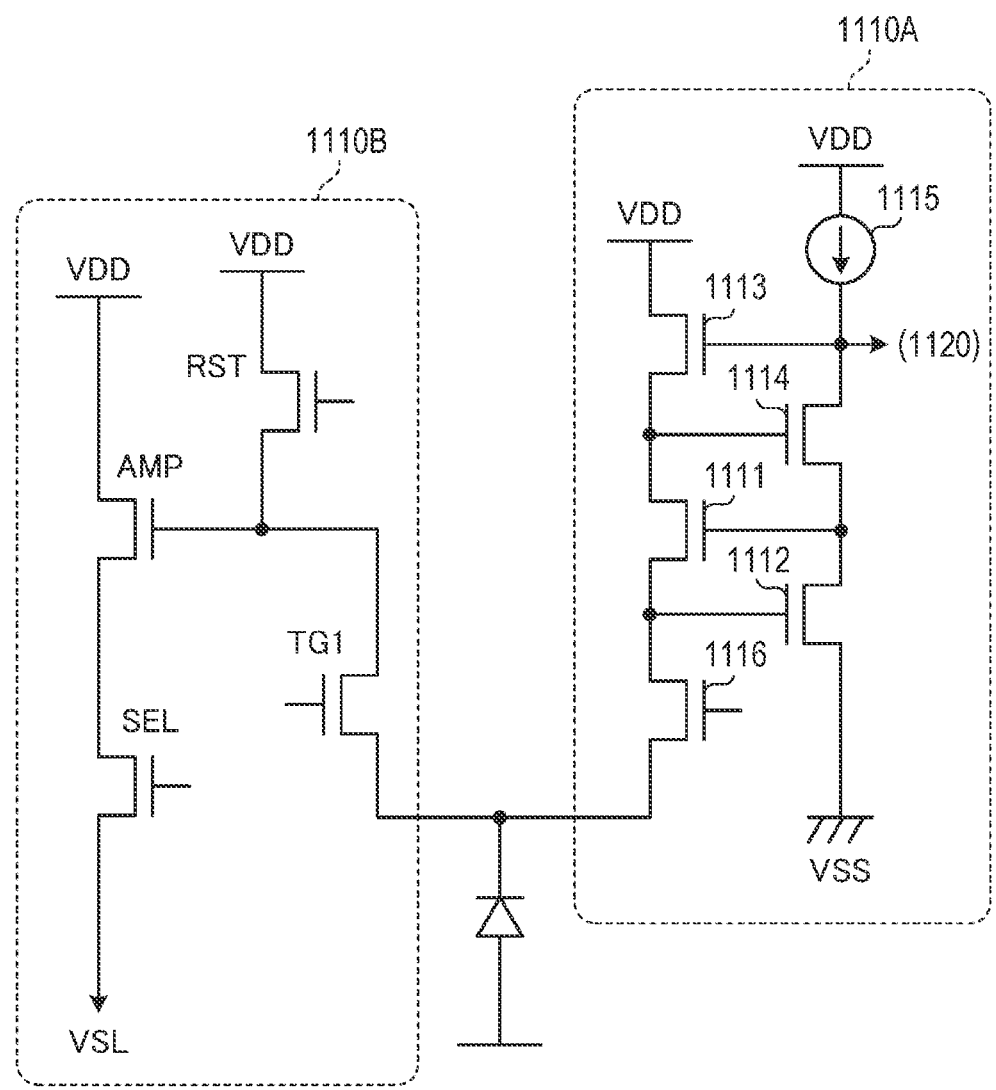
FIG. 21 is a diagram illustrating an exemplary schematic configuration of a unit pixel according to the second embodiment of the present disclosure.

FIG. 21 is a diagram illustrating an exemplary schematic configuration of a unit pixel 1101 according to the second embodiment of the present disclosure. In FIG. 21, in the unit pixels 1101, a photoelectric transducer 1104, a current-to-voltage converter 1110A, and a pixel transistor part 1110B are illustrated, and the same configuration as that in FIG. 3 is omitted.

The current-to-voltage converter 1110A further includes a TG transistor 1116 in addition to the configuration illustrated in FIG. 5.

As illustrated in FIG. 21, the TG transistor 1116 is arranged between the LG transistor 1111 and the photoelectric transducer 1104. The source of the TG transistor 1116 is connected to the cathode of the photoelectric transducer 1104. The drain of the TG transistor 1116 is connected to the source of the LG transistor 1111 and the gate of the amplification transistor 1112. The TG transistor 1116 is applied with a control signal output by the control unit 111. The control signal controls the TG transistor 1116 to turn on in the case where the range-finding apparatus 1 performs the distance measurement and to turn off in the case where it acquires an RGB image. This configuration allows the image-capturing device 100 to output a detection signal upon performing the distance measurement and does not output a detection signal upon acquiring an RGB image.

The pixel transistor part 1110B includes a transfer transistor TG1, a reset transistor RST, a selection transistor SEL, and an amplification transistor AMP.

The transfer transistor TG1 transfers the electric charge (electrical signal) generated in the photoelectric transducer 1104 to the floating diffusion (not illustrated). The amplification transistor AMP outputs a pixel signal with a voltage corresponding to the electric charge accumulated in the negative loading diffusion to a vertical signal line (not illustrated). The reset transistor RST discharges the electric charge accumulated in the floating diffusion. The selection transistor SEL selects the unit pixel 1101 to be readout.

Moreover, the configuration of the pixel transistor part 1110B illustrated in FIG. 21 is illustrative and is not limited to this example. In addition to the circuit configuration illustrated in FIG. 21, various circuit configurations are applicable as the pixel transistor part 1110B.

Figure 22:
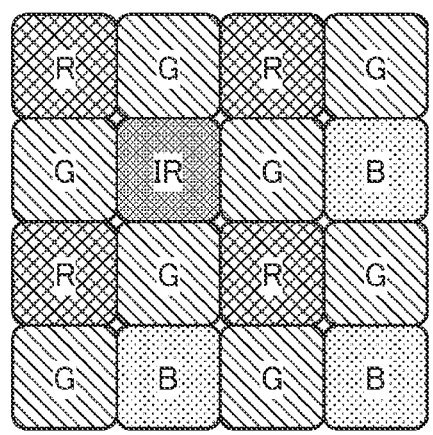
FIG. 22 is a diagram illustrating an example of the arrangement of unit pixels according to the second embodiment of the present disclosure.

The description is now given of the arrangement of the unit pixels 1101 according to the second embodiment of the present disclosure. FIG. 22 is a diagram illustrating an example of the arrangement of unit pixels 1101 according to the second embodiment of the present disclosure. As illustrated in FIG. 22, the unit pixels 1101 of the image-capturing device 100 according to the present embodiment include a normal pixel and an infrared (IR) pixel. The normal pixel receives R (red), G (green), and B (blue) light. The infrared pixel receives, for example, infrared light.

The normal pixel includes one color filter of R, G, and B filters stacked on the light-receiving surface of a photoelectric transducer (not illustrated). The normal pixels configure, for example, a Bayer array in the pixel array section 110. The description below is given that a normal pixel with a G filter stacked is referred to as a pixel G, a normal pixel with an R filter stacked is referred to as a pixel R, and a normal pixel with a B filter stacked is referred to as a pixel B.

The infrared pixel has an infrared filter stacked on the light-receiving surface of the photoelectric transducer. The infrared filter is capable of receiving infrared, that is, light with a wavelength in the infrared region. The Infrared pixels are arranged in a predetermined pixel row at predetermined intervals. In one example, the infrared pixels are arranged alternately with G pixels in a predetermined pixel row.

Figure 23:
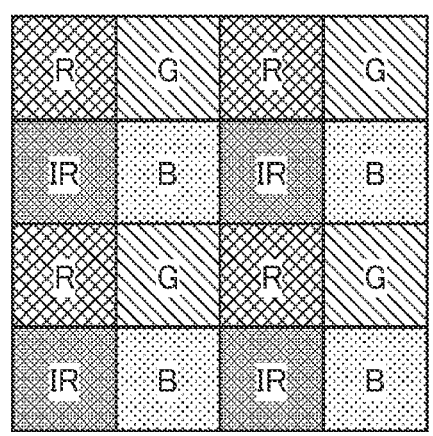
FIG. 23 is a diagram illustrating another example of the arrangement of unit pixels of the image-capturing device according to the second embodiment of the present disclosure.

FIG. 23 is a diagram illustrating another example of the arrangement of unit pixels 1101 of the image-capturing device 100 according to the second embodiment of the present disclosure. As illustrated in FIG. 23, the arrangement can be made sequentially at a position corresponding to the pixels G in the Bayer array of normal pixels in a predetermined pixel row and adjacent to the pixels B in the same row.

In this manner, the image-capturing device 100 according to the present embodiment has the normal pixel for capturing an RGB image and the infrared pixel for capturing an image for distance measurement.

Figure 24:
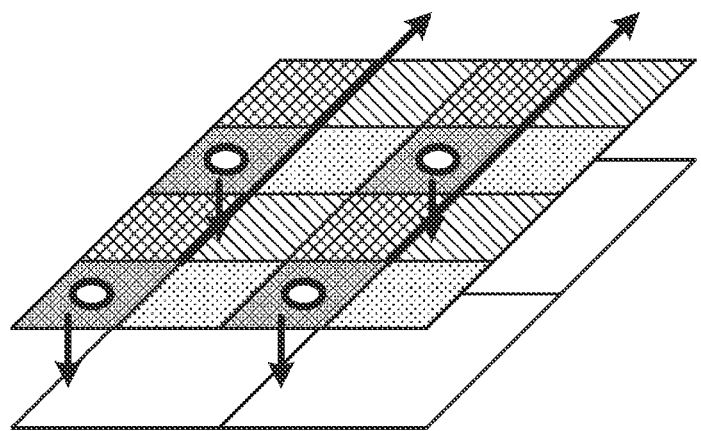
FIG. 24 is a diagram illustrated to describe an example of signal readout from the unit pixel according to the second embodiment of the present disclosure.

The description is now given of a way to read out a signal from the unit pixel 1101 according to the present embodiment. FIG. 24 is a diagram illustrated to describe an example of signal readout from the unit pixel 1101 according to the second embodiment of the present disclosure.

As illustrated in FIG. 24, the detector 1100 of the unit pixel 1101 is arranged on a substrate different from, for example, that of the optical receiver 1103. FIG. 24 illustrates an example in which the detector 1100 is arranged on a substrate under the substrate on which the optical receiver 1103 is arranged.

In this case, the electric charge (electric signal) generated in the optical receiver 1103 of the normal pixel is input to the output circuit 114 (see FIG. 20) through the output signal line and is converted into a digital pixel signal by the column AD of the output circuit 114.

On the other hand, the electric charge (electric signal) generated in the optical receiver 1103 of the infrared pixel is input to the detector 1100 on the lower substrate. The detector 1100 outputs a detection signal indicating whether or not the electric signal is larger than a threshold value.

Moreover, the detector 1100 is arranged on the lower substrate in this example, but such a configuration is not limited to this example. At least a part of the detector 1100, for example, the current-to-voltage converter 1110, can be arranged on the same substrate as the optical receiver 1103.

Figure 25:
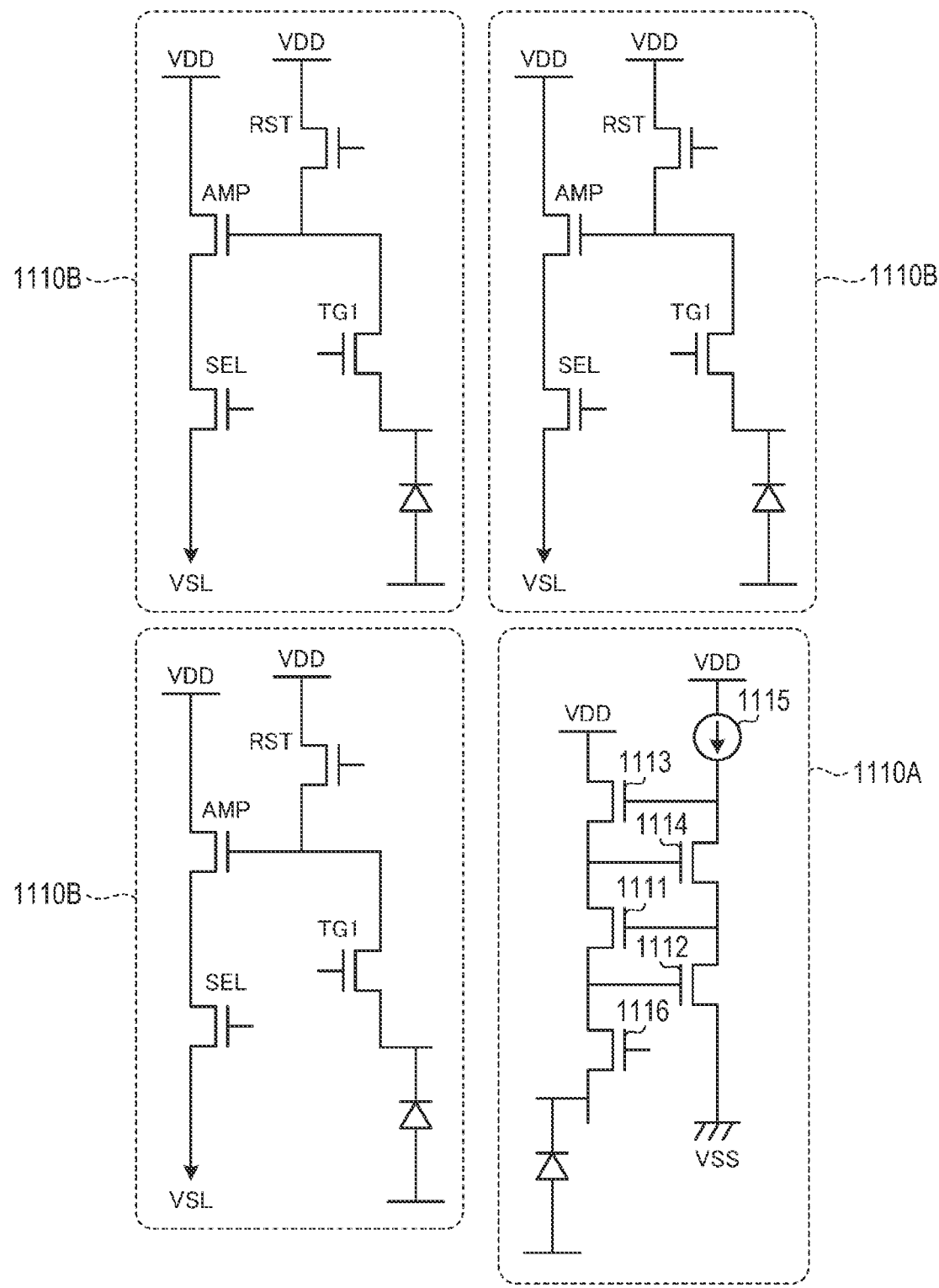
FIG. 25 is a diagram illustrating another example of a schematic configuration of a unit pixel according to the second embodiment of the present disclosure.

FIG. 25 is a diagram illustrating another example of the schematic configuration of the unit pixel according to the second embodiment of the present disclosure. The description of the examples described above is given for the case where the unit pixel 1101 includes the detector 1100 and the pixel transistor part 1110B regardless of the normal pixel or the infrared pixel, but such a configuration is not limited to the examples. In one example, as illustrated in FIG. 25, the normal pixel can include the pixel transistor part 1101B, and the infrared pixel can include the detector 1100. In this case, it is possible to omit unnecessary circuits, reducing the circuit scale of the pixel array section 110.

<2.3. Exemplary Operation of Image-Capturing Device>

Figure 26:
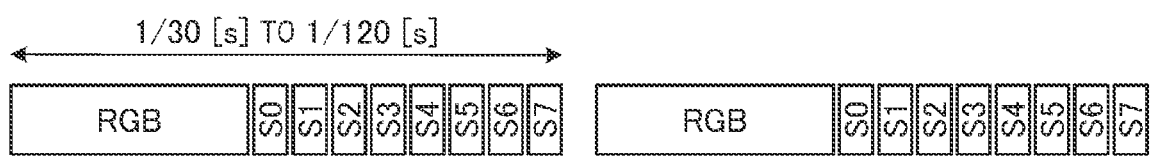
FIG. 26 is a diagram illustrating an example of an image-capturing timing of the image-capturing device according to the second embodiment of the present disclosure.

The description is now given of the operation of reading out the pixel signal in the image-capturing device 100 according to the present embodiment. FIG. 26 is a diagram illustrating an example of an image-capturing timing of the image-capturing device 100 according to the second embodiment of the present disclosure.

The image-capturing device 100 according to the present embodiment captures the RGB captured images and then captures the differential images S1 to Sn for depth calculation.

As illustrated in FIG. 26, the image-capturing device 100 first captures an RGB image with a normal pixel and then captures differential images S1 to Sn for depth calculation with infrared pixels (where n=7 in FIG. 26). Moreover, the reference signal is set in S0 illustrated in FIG. 26.

More specifically, the image-capturing device 100 initiates the exposure of a normal pixel. The image-capturing device 100 then sets a reference signal upon being irradiated with light of the background irradiation pattern P0 (S0). The image-capturing device 100 Subsequently acquires the differential images S1 to S7 corresponding to the irradiation patterns P1 to P7.

The image-capturing device 100 repeatedly acquires the RGB image and the depth-calculating differential images S1 to S7, for example, in a cycle from 1/30 second to 1/120 second.

As described above, the image-capturing device 100 is capable of outputting the differential images S1 to S7 for depth calculation at high speed. Thus, the RGB image and the differential images S1 to Sn for depth calculation can be captured by the same image-capturing device 100.

Figure 27:
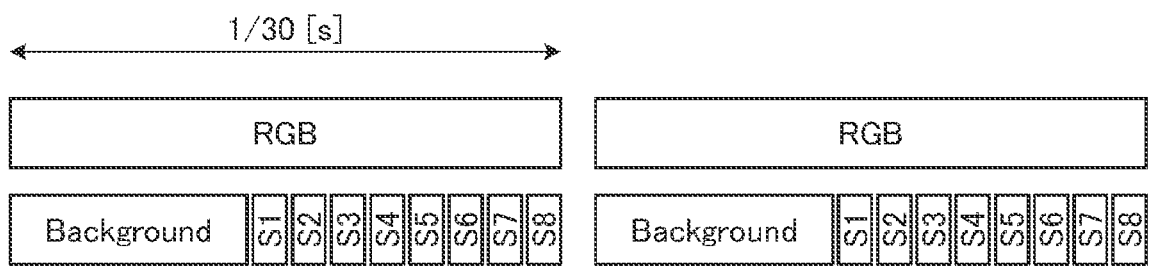
FIG. 27 is a diagram illustrated to describe another example of the image-capturing timing of the image-capturing device according to the second embodiment of the present disclosure.

FIG. 27 is a diagram illustrated to describe another example of the image-capturing timing of the image-capturing device 100 according to the second embodiment of the present disclosure. The description of the example described above is given for the case where the image-capturing device 100 captures the RGB image and the depth-calculating differential images S1 to Sn in this order, but such a configuration is not limited to the example. In one example, as illustrated in FIG. 27, the image-capturing device 100 can image the RGB image and the depth-calculating differential images S1 to Sn in parallel.

As illustrated in FIG. 27, the image-capturing device 100 captures an RGB image with the normal pixel and captures the depth-calculating differential images S1 to Sn (n=8 in FIG. 24) with the infrared pixel in parallel with the capturing of the RGB image. The image-capturing device 100 first sets a reference signal (Background in the figure) in the image capturing with the infrared pixel and then acquires the differential images S1 to S8. The image-capturing device 100 repeatedly performs the capturing of the RGB image and the depth-calculating differential images S1 to S8 in a cycle of, for example, 1/30 second.

In this way, simultaneous capturing of the RGB image and the depth-calculating differential images S1 to S8 by the image-capturing device 100 makes it possible to capture the RGB image and the depth-calculating captured images S1 to Sn by the same image-capturing device 100.

Herein, in one example, if the unit pixel 1101 includes both the detector 1100 and the pixel transistor part 1110B as illustrated in FIG. 21, the unit pixel 1101 is capable of reading out both the detection signal and the pixel signal simultaneously. Thus, the image-capturing device 100, when reading out both the distance to be measured and the captured image simultaneously, as illustrated in FIG. 27, can read out both the detection signal and the pixel signal from the unit pixel 1101 at the same time to simultaneously read out the image for ranging-finding and the normal captured image without distinguishing between the normal pixel and the infrared pixel. In this case, the unit pixel 1101 does not necessarily have both a normal pixel and an infrared pixel, and for example, all the unit pixels 1101 can be infrared pixels. In this case, the image-capturing device 100 acquires IR images rather than RGB images.

3. Other Embodiments

In the first and second embodiments described above, the light of the same irradiation pattern as the background irradiation pattern P0 is applied once at the end of the plurality of irradiation patterns P1 to Pn. In other words, the irradiation pattern Pn is the same irradiation pattern as the background irradiation pattern P0. However, the light of the same irradiation pattern as the background irradiation pattern P0 is not necessarily applied in the last, or the light of the irradiation pattern can be applied a plurality of times. In one example, the light of the same irradiation pattern as the background pattern among multiple irradiation patterns P1 to Pn can be applied every predetermined number of times. This configuration makes it possible to detect in more detail whether or not the to-be-measured object ob has moved at high speed, improving the accuracy of confidence coefficient calculation by the confidence coefficient generation unit 342.

Further, in the first and second embodiments described above, the image-capturing device 100 outputs the detection signal if the pixel signal is larger than the threshold value, but such a configuration is not limited to the example. In one example, the image-capturing device 100 can further output a detection signal if the pixel signal is smaller than the threshold value. In this case, the image-capturing device 100 outputs a detection signal (e.g., "−1") indicating that the pixel signal is smaller (darkened) than the threshold value.

As described above, in the case where the background irradiation pattern P0 is a non-irradiation pattern, during the subsequent irradiation patterns P1 to Pn, a detection signal indicating that each pixel has the same brightness as the non-irradiation is output, or a detection signal indicating that it is brighter is output. Thus, as described above, in the case of outputting the detection signal indicating that the pixel is darkened, the to-be-measured object ob or the image-capturing device 100 is likely to move or the ambient light is likely to vary, which is liable to fail to calculate the distance to the to-be-measured object ob accurately. Thus, the range-finding apparatus 1 sets the confidence coefficient of the pixel, which outputs the detection signal indicating that the pixel signal is smaller than the threshold value (darkened) to be lower. In one example, the confidence coefficient is set to be lower depending on the number of detection signals indicating "−1", and is set to the lowest value, for example, zero, if the number of detection signals indicating "−1" exceeds a predetermined threshold value.

Further, in the first and second embodiments described above, the background irradiation pattern P0 is a non-irradiation (all black) irradiation pattern, but such a configuration is not limited to the above example. The background irradiation pattern P0 can be any specified irradiation pattern and can be, for example, a whole all-white irradiation pattern. In this case, the last irradiation pattern Pn is the same irradiation pattern as the background irradiation pattern P0, so it is a whole irradiation pattern. In this case, the image-capturing device 100 outputs a detection signal indicating whether or not the pixel signal has fallen below the threshold value, in other words, whether or not each pixel has become dark.

In this way, the image-capturing device 100 detects whether or not the pixel signal has changed by a first value Th01 or more with respect to the threshold value. In the case where the background irradiation pattern P0 is a non-irradiation (all black) pattern, the first value is positive (Th01>0). On the other hand, in the case where the background irradiation pattern P0 is an irradiation pattern of whole irradiation (all white), the first value is negative (Th01<0).

As described above, in the case where the background irradiation pattern P0 is a non-irradiation (all black) pattern, the confidence coefficient is set depending on whether or not the pixel signal is darkened. In this case as well, in the case where the background irradiation pattern P0 is an irradiation pattern of whole irradiation, the confidence coefficient is set depending on whether or not the pixel signal is brightened. That is, the image-capturing device 100 detects whether or not the pixel signal has changed by a second value Th02 or more with respect to the threshold value. In the case where the background irradiation pattern P0 is a non-irradiation (all black) pattern, the second value is negative (Th02<0). On the other hand, in the case where the background irradiation pattern P0 is an irradiation pattern of whole irradiation (all white), the second value is positive (Th02>0).

4. Supplement

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The processes described in the above respective embodiments, the entirety or a part of the processes described as being automatically performed can be manually performed, or the entirety or a part of the processes described as being performed manually can be performed automatically using known methods. In addition, the details or information including processing procedures, specific names, various data, or various parameters indicated in the documents mentioned above and the drawings can be optionally modified unless otherwise specified. In one example, the various types of information illustrated in each figure are not limited to the illustrated information.

Further, the components of respective apparatuses or devices illustrated are functionally conceptual and do not necessarily have to be physically illustrated or configured. In other words, the specific form in which respective apparatuses or devices are distributed or integrated is not limited to the one illustrated in the figure, and their entirety or a part is functionally or physically distributed or integrated in any units depending on various loads or usage conditions.

Further, the embodiments and modifications described above can be appropriately combined as long as the processing details between them do not contradict.

Further, the effects described in this specification are merely illustrative or exemplified effects and are not necessarily limitative. That is, with or in the place of the above effects, the technology according to the present disclosure may achieve other effects that are clear to those skilled in the art on the basis of the description of this specification.

Additionally, the technical scope of the present disclosure may also be configured as below.

(1)

A range-finding apparatus including:
- a light source configured to project light with a first irradiation pattern in a first period and project light with a second irradiation pattern in a second period;
- an optical receiver configured to receive light to output a pixel signal;
- a setting unit configured to set a reference signal on the basis of the pixel signal in the first period;
- a detector configured to detect whether or not the pixel signal varies from the reference signal by a first value or more in the second period and output a first detection signal indicative of a result obtained by the detection; and
- a calculation unit configured to calculate a distance to a to-be-measured object using the first detection signal.

(2)

The range-finding apparatus according to (1), in which the detector outputs the first detection signal in synchronization with the projection by the light source.

(3)

The range-finding apparatus according to (1) or (2),
- in which the second irradiation pattern includes a plurality of irradiation patterns different from each other,
- the light source projects the light with the plurality of irradiation patterns included in the second irradiation pattern in the second period, and
- the detector individually outputs, as the first detection signal, a plurality of detection signals corresponding one-to-one to the respective plurality of irradiation patterns in the second period on the basis of the pixel signal corresponding to each of the plurality of irradiation patterns and the reference signal.

(4)

The range-finding apparatus according to (3), in which the calculation unit calculates the distance using an integration signal obtained by integrating the respective plurality of detection signals corresponding one-to-one to the respective plurality of irradiation patterns.

(5)

The range-finding apparatus according to (3) or (4), in which the calculation unit sets a confidence coefficient of the distance, in a case where values of the respective plurality of detection signals corresponding one-to-one to the respective plurality of irradiation patterns are identical, to be lower than in a case where the values are different.

(6)

The range-finding apparatus according to any one of (3) to (5),
- in which the detector further detects whether the pixel signal varies from the reference signal by a second value or more, and outputs a second detection signal indicative of a result obtained by the detection, and the calculation unit sets a confidence coefficient of the distance depending on the second detection signal.

(7)

The range-finding apparatus according to any one of (3) to (6),
- in which the light source projects light with a third irradiation pattern that is an irradiation pattern identical to the first irradiation pattern in the second period,
- the detector compares the pixel signal corresponding to the third irradiation pattern with the reference signal to output a third detection signal, and
- the calculation unit sets a confidence coefficient of the distance on a basis of the third detection signal.

(8)

The range-finding apparatus according to any one of (1) to (7), further including: a processing unit configured to cause a pixel of the optical receiver to be driven and read out the pixel signal.

(9)

The range-finding apparatus according to (8), in which the processing unit reads out the pixel signal in a period in which the first period and the second period are combined.

(10)

The range-finding apparatus according to (8), in which the detector outputs the first detection signal after the processing unit reads out the pixel signal.

(11)

The range-finding apparatus according to any one of (8) to (10),
in which the optical receiver includes a color pixel used for detecting a predetermined color and an infrared (IR) pixel used for detecting infrared light,
the processing unit reads out the pixel signal from the color pixel, and
the detector outputs the first detection signal on a basis of the pixel signal output by the IR pixel.

(12)

The range-finding apparatus according to any one of (1) to (11), in which the optical receiver receives the light in synchronization with the projection by the light source.

(13)

A range-finding method including:
projecting light with a first irradiation pattern in a first period and projecting light with a second irradiation pattern in a second period;
receiving light to output a pixel signal;
setting a reference signal on the basis of the pixel signal in the first period;
detecting whether or not the pixel signal varies from the reference signal by a first value or more in the second period and outputting a first detection signal indicative of a result obtained by the detection; and
calculating a distance to a to-be-measured object using the first detection signal.

REFERENCE SIGNS LIST

1 Range-finding apparatus
100 Image-capturing device
200 Projector
300 Entire-apparatus control unit
400 Storage unit
310 Timing control unit
320 Projection image generation unit
330 Data acquisition unit
340 Signal processing unit

The invention claimed is:

1. A range-finding apparatus, comprising:
a light source configured to:
project a first light with a first irradiation pattern in a first period; and
project a second light with a second irradiation pattern, in a second period, wherein
the second irradiation pattern includes a plurality of specific irradiation patterns,
each of the plurality of specific irradiation patterns is different, and
the first period is different from the second period;
an optical receiver configured to:
receive the first light to output a first pixel signal; and
receive the second light to output a second pixel signal;
a setting unit configured to set a reference signal based on the first pixel signal in the first period;
a detector configured to:
detect that the second pixel signal varies from the set reference signal by at least a first value, in the second period; and
output a first detection signal indicative of a result of the detection, wherein
the first detection signal is in synchronization with the projection of the second light,
the first detection signal includes a plurality of detection signals,
each detection signal of the plurality of detection signals corresponds to a respective irradiation pattern of the plurality of specific irradiation patterns, and
the output of each detection signal of the plurality of detection signals is based on the second pixel signal and the first pixel signal; and
a calculation unit configured to:
integrate the plurality of detection signals to obtain an integration signal; and
calculate a distance between an object and the range-finding apparatus, based on the integration signal.

2. The range-finding apparatus according to claim 1, wherein
in a case where values of the plurality of detection signals are identical, the calculation unit is further configured to set a first confidence coefficient of the distance,
in a case where the values of the plurality of detection signals are different, the calculation unit is further configured to set a second coefficient of the distance, and
the first confidence coefficient is lower than the second coefficient.

3. The range-finding apparatus according to claim 1, wherein
the detector is further configured to:
detect that the second pixel signal varies from the set reference signal by at least a second value; and
output a second detection signal, wherein the second detection signal indicates a result of the detection of the variation of the second pixel signal from the set reference signal, and
the calculation unit is further configured to set a confidence coefficient of the distance based on the second detection signal.

4. The range-finding apparatus according to claim 1, wherein
the light source is further configured to project a third light with a third irradiation pattern,
the third irradiation pattern is identical to the first irradiation pattern, in the second period,
the detector is further configured to:
compare a third pixel signal corresponding to the third irradiation pattern with the set reference signal; and
output a second detection signal, and
the calculation unit is further configured to set a confidence coefficient of the distance based on the second detection signal.

5. The range-finding apparatus according to claim 1, further comprising a processing unit configured to:
drive the optical receiver; and
read out each of the first pixel signal and the second pixel signal.

6. The range-finding apparatus according to claim 5, wherein
the each of the first pixel signal and the second pixel signal is read out in a specific period, and the specific period includes the first period and the second period.

7. The range-finding apparatus according to claim 5, wherein the detector is further configured to output the first detection signal after the read out of the each of the first pixel signal and the second pixel signal.

8. The range-finding apparatus according to claim 5, wherein
the optical receiver includes:
a color pixel configured to detect a specific color, and
an infrared (IR) pixel configured to:
detect infrared light, and
output a third pixel signal,
the processing unit is further configured to read out each of the first pixel signal and the second pixel signal from the color pixel, and
the detector is further configured to output the first detection signal based on the third pixel signal.

9. The range-finding apparatus according to claim 1, wherein the optical receiver is further configured to receive each of the first light and the second light in synchronization with the projection of the first light and the second light respectively.

10. A range-finding method, comprising:
projecting a first light with a first irradiation pattern in a first period;
projecting a second light with a second irradiation pattern, in a second period, wherein
the second irradiation pattern includes a plurality of specific irradiation patterns,
each of the plurality of specific irradiation patterns is different, and
the first period is different from the second period;
receiving the first light to output a first pixel signal;
receiving the second light to output a second pixel signal;
setting a reference signal based on the first pixel signal in the first period;
detecting that the second pixel signal varies from the set reference signal by at least a value, in the second period;
outputting a first detection signal indicative of a result of the detection, wherein
the detection signal is in synchronization with the projection of the second light,
the detection signal includes a plurality of detection signals,
each detection signal of the plurality of detection signals corresponds to a respective irradiation pattern of the plurality of specific irradiation patterns, and
the output of each detection signal of the plurality of detection signals is based on the second pixel signal and the first pixel signal;
integrating the plurality of detection signals to obtain an integration signal; and
calculating a distance between an object and a range-finding apparatus, based on the integration signal.

* * * * *